US007016110B2

(12) United States Patent
Leblans

(10) Patent No.: US 7,016,110 B2
(45) Date of Patent: Mar. 21, 2006

(54) MICROSCOPE SUITABLE FOR HIGH-THROUGHPUT SCREENING HAVING AN AUTOFOCUSING APPARATUS

(75) Inventor: Marc Jan René Leblans, Wilrijk (BE)

(73) Assignee: Tibotec BVBA, Beerse (BE)

( * ) Notice: Subject to any disclaimer, the term of this patent is extended or adjusted under 35 U.S.C. 154(b) by 127 days.

(21) Appl. No.: 10/220,872

(22) PCT Filed: Mar. 8, 2001

(86) PCT No.: PCT/EP01/02807

§ 371 (c)(1),
(2), (4) Date: Dec. 20, 2002

(87) PCT Pub. No.: WO01/67154

PCT Pub. Date: Sep. 13, 2001

(65) Prior Publication Data

US 2003/0142398 A1 Jul. 31, 2003

(51) Int. Cl.
*G02B 21/26* (2006.01)

(52) U.S. Cl. .................... 359/391; 359/368; 359/382; 359/383; 359/393

(58) Field of Classification Search ............ 359/368, 359/372, 382–384, 391, 393
See application file for complete search history.

(56) References Cited

U.S. PATENT DOCUMENTS

| 3,721,827 A | 3/1973 | Reinheimer ............... 250/201.3 |
| 3,816,930 A | 6/1974 | Edenholm ..................... 33/503 |
| 4,025,785 A | 5/1977 | Mueller ....................... 250/204 |
| 4,163,150 A | 7/1979 | Stankewitz ................. 250/205 |
| 4,186,480 A | 2/1980 | Binder Kriegelstein et al. ....................... 29/603.04 |

(Continued)

FOREIGN PATENT DOCUMENTS

| DE | 3739223 | 6/1989 |
| FR | 2620537 | 7/1991 |
| FR | 2750221 | 12/1997 |
| GB | 1401179 | 7/1975 |
| GB | 1545437 | 5/1979 |

(Continued)

OTHER PUBLICATIONS

Ali Kujoory, M. et al., "Focus–assist device for a flying–spot microscope," *IEEE Trans on Biom. Eng.*, 1973, 20(2), 126–132.
Firestone, L. et al., "Comparison of Autofocus Methods for Automated Microscopy," *Cytometry*, 1991, 12, 195–206.
Groen, F.A. et al., "A Comparison of Different Focus Functions for Use in Autofocus Algorithms," *Cytometry*, 1985, 6, 81–91.

(Continued)

*Primary Examiner*—Drew A. Dunn
*Assistant Examiner*—Joshua L Pritchett
(74) *Attorney, Agent, or Firm*—Woodcock Washburn LLP

(57) ABSTRACT

The apparatus for automatically focusing an image in a microscope includes onto an object plane includes an optical system configured to form an optical image of a sample plane to be observed, an autofocusing detection system, and a focus correction system. The autofocusing system includes an autofocusing light beam source for generating autofocusing light beams. The autofocusing system further includes a detection system lens for directing autofocusing light beams to an autofocusing detection device, and an autofocusing detection device for determining the amount of displacement of the image of the object plane from a desired focused reference plane. The focusing correction system includes a feedback controller and focus adjusting device for automatically adjusting the distance between an objective lens and the sample plane in order to properly focus the image in the optical system. A related method of automatically focusing an image of an object plane in a microscope.

1 Claim, 14 Drawing Sheets

U.S. PATENT DOCUMENTS

| | | | |
|---|---|---|---|
| 4,311,904 A | 1/1982 | Okada et al. | 250/204 |
| 4,387,975 A | 6/1983 | Araki | 396/96 |
| 4,433,235 A | 2/1984 | Akiyama et al. | 250/201.4 |
| 4,450,547 A | 5/1984 | Nakamura et al. | 396/44.24 |
| 4,595,829 A | 6/1986 | Neumann et al. | 250/201.4 |
| 4,600,832 A | 7/1986 | Grund | 250/201.7 |
| 4,635,887 A | 1/1987 | Hall et al. | 248/179.1 |
| 4,639,587 A | 1/1987 | Chadwick et al. | 250/201.3 |
| 4,711,537 A | 12/1987 | Schindl et al. | 359/393 |
| 4,803,352 A | 2/1989 | Bierleutgeb | 250/201.3 |
| 4,935,612 A | 6/1990 | Bierleutgeb | 250/201.2 |
| 4,945,220 A * | 7/1990 | Mallory et al. | 250/201.3 |
| 4,958,920 A | 9/1990 | Jorgens et al. | 359/392 |
| 5,081,349 A * | 1/1992 | Iwasaki | 250/234 |
| 5,122,648 A | 6/1992 | Cohen et al. | 250/201.3 |
| 5,159,383 A | 10/1992 | Ishida et al. | 396/114 |
| 5,270,527 A | 12/1993 | Salzmann | 250/201.3 |
| 5,270,763 A | 12/1993 | Ogasawara | 396/96 |
| 5,271,592 A | 12/1993 | Ludwig | 248/333 |
| 5,359,417 A | 10/1994 | Muller et al. | 356/623 |
| 5,434,703 A | 7/1995 | Morizumi | 359/385 |
| 5,483,055 A | 1/1996 | Thompson et al. | 250/201.3 |
| 5,483,079 A | 1/1996 | Yonezawa | 250/559.29 |
| 5,672,861 A | 9/1997 | Fairley et al. | 250/201.3 |
| 5,710,662 A | 1/1998 | Nishida | 359/368 |
| 5,783,814 A | 7/1998 | Fairley et al. | 250/201.3 |
| 5,804,813 A | 9/1998 | Wang et al. | 250/201.3 |
| 5,805,335 A | 9/1998 | Fukaya et al. | 359/384 |
| 5,811,821 A | 9/1998 | Alexander et al. | 250/440 |
| 5,877,489 A | 3/1999 | Ortyn et al. | 250/201.3 |
| 5,886,813 A | 3/1999 | Nagasawa | 359/383 |
| 5,892,622 A | 4/1999 | Abe | 359/618 |
| 5,925,874 A | 7/1999 | Liegel et al. | 250/201.3 |
| 5,995,143 A | 11/1999 | Price et al. | 348/345 |
| 6,021,991 A | 2/2000 | Mayama et al. | 248/550 |
| 6,111,647 A | 8/2000 | Ogura et al. | 356/615 |
| 6,636,262 B1 * | 10/2003 | Okajima et al. | 348/350 |
| 6,738,189 B1 | 5/2004 | Ulrich et al. | 359/368 |
| 2003/0142398 A1 | 7/2003 | Leblans | 359/383 |

FOREIGN PATENT DOCUMENTS

| | | |
|---|---|---|
| JP | 57064712 | 4/1982 |
| JP | 57192909 | 11/1982 |
| JP | 58160907 | 9/1983 |
| JP | 60118814 | 6/1985 |
| JP | 60217322 | 10/1985 |
| JP | 61143709 | 7/1986 |
| WO | WO 92/06359 | 4/1992 |

OTHER PUBLICATIONS

Harns, H. et al., "Comparison of Digital Focus Criteria for a TV Microscope System," *Cytometry*, 1984, 5, 236–241.

Johnson, E.T. et al., "Metaphase spread detection and focus using closed circuit television," *J. Histochem. Cytochem.*, 1974, 22(7), 536–587.

Price, J. et al., "Comparison of phase–contrast and fluorescence digital autofocus for scanning microscopy," *Cytometry*, 1994, 16, 282–297.

Web page article, "Memory and storage" by the editors of Time–Life Books, http//www.ee.washington.edu/conselec/CE/kuhn/cdmulti/cdhome.gif, 1990.

* cited by examiner

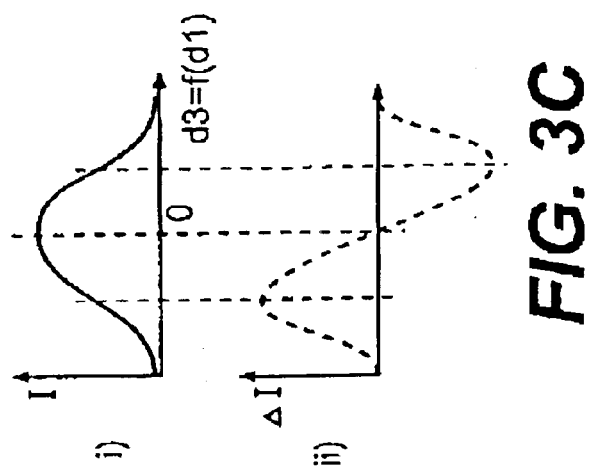
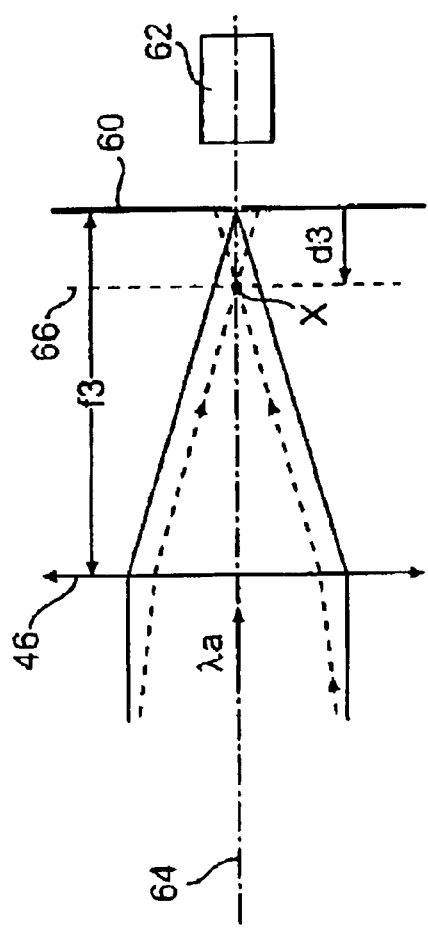
FIG. 3C
FIG. 3B

MICROSCOPE SUITABLE FOR HIGH-THROUGHPUT SCREENING HAVING AN AUTOFOCUSING APPARATUS

CROSS REFERENCE TO RELATED APPLICATIONS

This application is the national stage of Application No. PCT/EP01/02807, filed Mar. 8, 2001 which application claims priority from U.S. Ser. No. 09/521,618, filed Mar. 8, 2000, incorporated herein by reference.

BACKGROUND OF THE INVENTION

1. Field of the Invention

The present invention relates to a microscope suitable for high-throughput screening comprising an autofocusing apparatus having an unfolded, main optical axis. Further the invention also relates to an autofocusing apparatus and to an autofocusing method useful in high-throughput screening.

2. Description of the Related Art

Autofocusing techniques for microscopes have been available for many years.

Most autofocus methods fall into two categories: position sensing and image content analysis. Image content autofocus functions have previously been compared for brightfield microscopy. Groen, Young and Ligthart (Groen FCA, Young IT, Ligthart G: A comparison of different focus functions for use in autofocus algorithms. Cytometry 6:81–91, 1985) compared 11 autofocus functions under brightfield using an electron microscope grid and a metaphase spread, and Vollath (Vollath D: Automatic Focusing by Correlative Methods. J Microsc 147:279–288, 1987) tested an autocorrelation function under brightfield using a paralytic steel specimen. Groen et al. concluded that three autofocus functions, i.e., two gradient functions and the intensity variance, performed the best. Its most important limitation is speed, which is dependent on the calculation performances.

In a typical autofocusing image content technique, an objective lens is placed at a predetermined distance from the sample to be scanned, and an image is taken of the object. The image created by the microscope is then typically evaluated to determine the position at which the surface of the object, or a plane within the object, is in focus. The evaluation of the image typically involves analyzing characteristics of the image such as entropy, spatial resolution, spatial frequency, contrast, or other characteristics. The analysis of these characteristics requires a considerable amount of computer processing. Once the characteristics are analyzed, the distance between the objective lens and the object to be scanned is varied, and another image is taken. The new image is then evaluated and the process is repeated several times before a focused image is finally obtained. Repeating the step of analyzing the image may cause the focusing operation to take an undesirably long time before the microscope is finally focused on the object surface. The need for increased processing time for autofocusing can be particularly acute for various types of imaging operations. For example, when an object is observed under a microscope, the focused conditions must be maintained in order to maintain a properly focused image of the object. Therefore, even if the object is initially in focus, the object may gradually become out of focus due to a variety of external factors such as thermal effects and vibration, if no corrective steps are taken. Moreover, when an object is larger than the field of view of the microscope, the microscope can only focus on the portion of the object that can be observed through the field of view of the microscope. Therefore, the focusing conditions must be regularly checked and adjusted In order to maintain a sharp image of the whole object.

In view of the foregoing, there is a need for an improved autofocusing system and method for a microscope that can perform quick and accurate autofocusing operations while maintaining a sharp image.

The present invention is in a first aspect related to a microscope having autofocus position sensing means useful in high-throughput screening. The uncertainty in applying autofocus test results from one microscope method to another led to the present invention. The development of the present invention included exploring autofocus performance in microscopy of fluorescent stained biologic specimens.

Several autofocus position sensing methods and apparatuses are known, for example from Offenlegungsschrift DE 34 46 727 and DE 33 28 821. These German documents disclose an autofocus device for a microscope wherein variations in light intensity originating from two separate light sources provide a signal for focus adjustment. These known autofocus methods are in particular useful for flat samples to be imaged. The autofocusing light beams travel along a substantial large part including several optical elements, such as a plurality of lenses and at least two beam splitters. This large part causes a substantial delay in the autofocusing procedure. The present invention is directed to a more simplified autofocus system whereby the part of autofocusing light is minimized. The uncertainty in applying autofocus test results from one microscope method to another led to the present invention. The development of the present invention included exploring autofocus performance in microscopy of fluorescent stained biologic specimens.

SUMMARY OF THE INVENTION

The advantages and purposes of the invention will be set forth in part in the description which follows, and in part will be obvious from the description, or may be learned by practice of the invention. The advantages and purposes of the invention will be realized and attained by means of the elements and combinations particularly pointed out in the appended claims.

To attain the advantages and in accordance with the purposes of the invention, as embodied and broadly described herein, in a first aspect the invention is directed toward a microscope for viewing an object plane. The microscope includes a plurality of lenses positioned along a main optical axis of the microscope and a probe arm supporting the plurality of lenses. The probe arm extends generally along the main optical axis. The microscope further includes a support on which an object with an object plane to be examined is placed, the object plane substantially extending along a focus plane that is observed through the microscope, and an optical output device for creating an image of the object plane on an image plane. The main optical axis is unfolded and substantially extends along a single plane.

In yet another aspect, the invention is directed to autofocusing methods and apparatuses using fluorescent imaging techniques, whereby the wavelengths of the autofocusing light beams, the illumination and the excitation light beams are chosen within specified ranges.

In yet still another aspect, the invention is related to the use of a method for autofocusing in a microscope for high-throughput screening.

In another aspect the invention is related to a microscope having automatically focusing means for autofocusing an image of an object plane. The microscope generally includes an optical system configured to form an image of an object plane to be observed, an autofocusing detection system, and a focusing correction system. The optical system includes an objective lens configured to focus on the object plane, an illumination beam source for illuminating the object plane with an illumination light beam, and an image lens configured to create an image of the object plane. The autofocusing detection system includes an autofocusing light beam source for generating an autofocusing light beam, a beamsplitter configured to direct the autofocusing light beam to the object plane and cause the autofocusing light beam to reflect off the object plane, a detection system lens configured to direct the reflected autofocusing light beam to an autofocusing detection device, and an autofocusing detection device. The autofocusing detection device determines the amount of displacement of the image of the object plane in the optical system from a desired focused reference plane based on the detected displacement of an image plane of the reflected autofocusing light beam from a predetermined reference plane in the autofocusing detection system. The autofocusing detection device includes at least one sensor for sensing the reflected autofocusing light beam and detecting the displacement of the image plane. The focusing correction system includes a feedback controller and focus adjusting device for automatically adjusting the distance between the objective lens and the object plane, based on the reflected autofocusing light beam sensed by the at least one sensor, in order to properly focus the image in the optical system.

In a further aspect, the invention is directed toward a system for automatically focusing an image in a microscope. The system includes an imaging system for creating an image of an object plane using an illumination light beam of a first wavelength, and an autofocusing detection system. The autofocusing detection system includes an autofocusing light beam of a second wavelength. The autofocusing light beam is directed to reflect off of the object plane. The autofocusing detection system further includes a autofocusing detection device having an iris and a light detector, and a detection system lens. The detection system lens directs the reflected autofocusing light beam to the autofocusing detection device. The autofocusing detection device receives the reflected autofocusing light beam from the detection system lens. The iris permits at least a portion of the reflected autofocusing light beam to pass through an aperture of the iris. The light detector measures the intensity of the portion of the reflected autofocusing light beam that passes through the aperture of the iris in order to detect the distance that the image of the object plane in the imaging system is displaced from a desired focus reference surface.

In another aspect, the invention is directed toward another embodiment of a microscope able to automatically focus an image. The system includes an imaging system for creating an image of an object plane using an illumination light beam of a first wavelength, and an autofocusing detection system. The autofocusing detection system includes an autofocusing light beam of a second wavelength. The autofocusing light beam is directed to reflect off of the object plane. The autofocusing detection system further includes a autofocusing detection device comprising a plurality of light sensors, and a detection system lens. The detection system lens directs the reflected autofocusing light beam to the autofocusing detection device. The autofocusing detection device receives the reflected autofocusing light beam from the detection system lens. The plurality of light detectors measures the light intensity of the reflected autofocusing light beam in order to detect the distance that the image of the object surface in the imaging system is displaced form a desired focus reference surface.

In yet another aspect, the invention is directed toward a method of automatically focusing an image of an object plane in a microscope. The method includes generating an autofocusing light beam, directing the autofocusing light beam against the object plane to be examined, and reflecting the autofocusing light beam off the object plane. The method further includes directing the reflected autofocusing light beam to a detection system and sensing the autofocusing light beam with a light detector of the detection system. The method further includes determining, based on the sensed autofocusing light beam, the amount of displacement of the image plane of the reflected autofocusing light beam from a desired reference plane, and focusing on the object plane to create a properly focused image. The sensing includes transmitting the reflected autofocusing light beam at least partially through an aperture of an iris and measuring the light intensity of the reflected autofocusing light beam that is transmitted through the aperture with the light detector of the detection system.

In a further aspect, the invention is directed toward a method of automatically focusing an image of an object plane in a microscope. The method includes generating an autofocusing light beam, directing the autofocusing light beam against the object plane to be examined, and reflecting the autofocusing light beam off the object plane. The method further includes directing the reflected autofocusing light beam to a detection system and sensing the autofocusing light beam with a plurality of light detectors of the detection system. The method further includes determining, based on the sensed autofocusing light beam, the amount of displacement of the image plane of the reflected autofocusing light beam from a desired reference plane, and focusing on the object plane to create a properly focused image. The determining includes comparing the light intensities of the reflected autofocusing light beam detected by the plurality of light detectors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

FIG. 3B illustrates an autofocusing detection device of the autofocusing system of FIG. 3A;

FIG. 3C is a graph of the light intensity detected by the autofocusing detection device of FIG. 3B at various relative positions between an actual image plane and a desired image plane;

FIGS. 7A, 7B, and 7C illustrate the position of light dots formed on diodes of the autofocusing detection device of FIG. 5 with the object plane in focus, the object plane too far from the objective lens, and the object plane too close to the objective lens, respectively;

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

As of specific importance for a microscope the autofocusing systems included will be discussed in first instance.

The present invention provides a microscope having automatically focusing means for automatically focussing the microscope onto a plane of an object such as a sample.

For reasons of clarity the details of the autofocusing apparatus and system and of the microscope will be discussed separately. However, all features are included.

According to an embodiment of the invention, an autofocusing apparatus is provided that includes an optical system configured to form an optical image of a sample plane to be observed, an autofocusing detection system, and a focus correction system. The optical system may include an objective lens, an illumination beam source for illuminating the sample plane with an illumination beam, and an image lens, such as a converging lens, for creating an image of the sample plane. The autofocusing detection system may include a autofocusing light beam source for generating an autofocusing light beam, a beamsplitter configured to direct the autofocusing light beam to the sample plane and causing the autofocusing light beam to reflect off the sample surface.

The autofocusing detection system of the present invention may further include detection system lens configured to direct the returning autofocusing light beam to an autofocusing detection device. The autofocusing detection device preferably determines the amount of displacement of the image of the sample surface from a desired focused reference plane based on the detected displacement of an image plane of the autofocusing light beam from a predetermined reference plane in the autofocusing detection device. The focusing correction system preferably includes a feedback controller and focus adjusting device for automatically adjusting the distance between the objective lens and the sample plane in order to properly focus the image in the optical system. The present invention also relates to a method of automatically focusing an image of an sample plane in a microscope.

Figure 1:
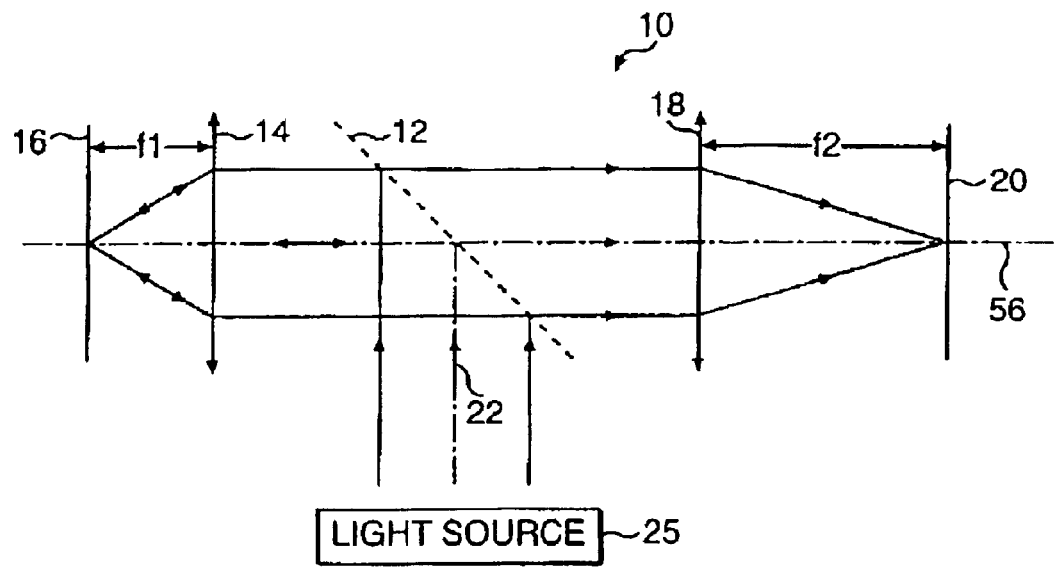
FIG. 1 illustrates the basic principles of an optical system for forming an image of an object plane according to the present invention.
Figure 2:
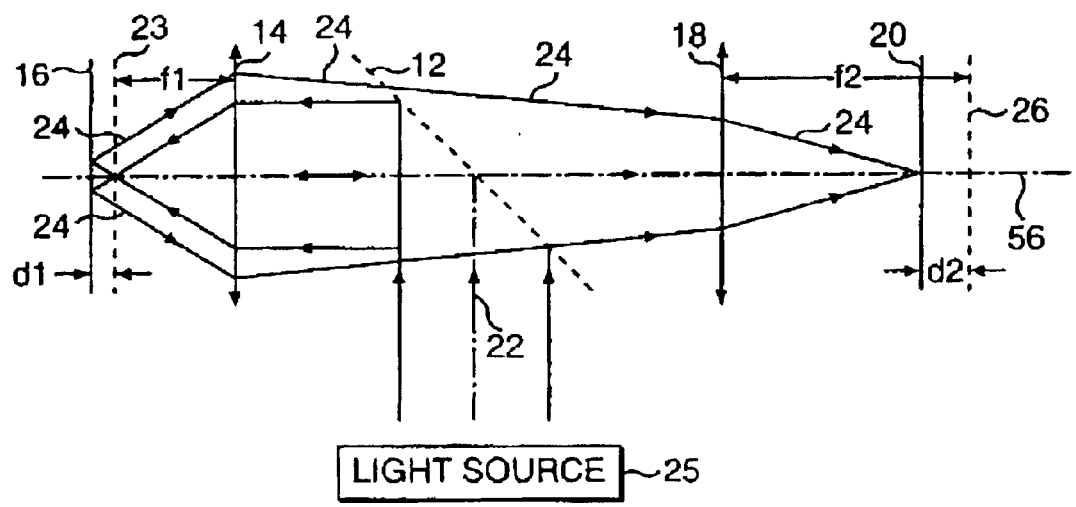
FIG. 2 illustrates the optical system of FIG. 1 with the object plane in and out of focus.

In a microscope, when the sample plane is not located at the focal distance from the objective lens, the resulting image in the microscope will be out of focus. FIGS. 1 and 2, for example, illustrate how this problem can arise in an optical system for forming an optical image of a sample to be observed in a microscope. The system of FIGS. 1–2 is shown for purposes of illustration only, and does not include the autofocusing system of the present invention which will be described in greater detail below with reference to FIGS. 3–8.

As embodied herein and shown in FIGS. 1–2, the optical system 10 forms an optical image of a sample plane 16 to be observed in the microscope. Optical system 10 includes a beamsplitter 12, an objective lens 14, a partially reflecting object plane or sample plane 16, an image lens 18, an image plane 20, and a source 25 of an illumination light beam 22. In the example shown in FIG. 1, the sample plane 16 of the sample is positioned at a distance that corresponds to the focal distance (f1) of the objective lens 14. As a result, in the microscope of FIG. 1, the resulting image of the sample is properly focused. In contrast, the sample plane 16 in FIG. 2 is placed at a position that deviates (by d1) from the focal distance of the lens 14 and, therefore, the resulting image is not properly focused. In FIGS. 1 and 2, the partially reflecting plane 16 may correspond to either the bottom of the sample surface or a plane on the inside of the sample. Alternately, the sample plane 16 may correspond to the bottom of the surface on which the sample is placed. For purposes of the discussion below, the plane to be focused will be referred to as the sample plane 16.

As illustrated in FIGS. 1 and 2, light source 25 generates an illumination light beam 22. The illumination light beam 22 may be of any wavelength that is suitable for illuminating a sample plane in a microscope. Although the example shown illustrates the illumination light beam being collimated, it is not necessary for the beam to be collimated. The beam could also be divergent or convergent. For sake of discussion, the use of a collimated light beam will be described. The light source 25 may be any conventional type of light source such as a lamp or laser. Although FIGS. 1 and 2 show the light source being located adjacent to a beamsplitter 12, it is also feasible to place the light source on the left side of the sample plane 16 in the figures in order to trans-illuminate the sample plane. In such a configuration, the beam splitter 12 would not be necessary. In an alternate configuration, the sample plane may emit light by itself without the need for a specific illumination light source. One example of when this may occur is when a sample undergoes a luminescent chemical reaction. The specific types of light sources and the preferred wavelengths of the illumination light beam will be discussed later with reference to the disclosed autofocusing detection systems of the present invention.

In the examples of FIGS. 1 and 2, the illumination light beam 22 is directed toward a beamsplitter 12. The beamsplitter 12 may be any type of conventional beamsplitter suitable for use in the present invention. The beamsplitter 12 reflects the illumination light beam 22 toward the objective lens 14 and sample plane 16 located along the first optical axis 56. In FIG. 1, the sample plane 16 is positioned exactly in the focal plane of the objective lens 14, i.e., at the focal distance f1 from the objective lens 14. Because the sample plane 16 is positioned exactly the focal distance away from the objective lens 14, the outer boundaries of the illumination light beam 22 from the objective lens 14 will intersect at a single point on the sample plane 16, as shown in FIG. 1. The objective lens 14 is said to be focused on the sample plane 16 in such an arrangement where the light beam intersects to strike a single point on the surface, i.e., the diameter of the light beam will be a minimum.

The illumination light beam 22 which strikes the plane 16 is reflected off of the plane 16 and back to the objective lens 14. As the illumination light beam passes through the objective lens 14, the illumination light beam is collimated back into its original form and directed toward the beamsplitter 12. The beamsplitter 12 is configured so that the illumination light beam that returns along the first optical axis 56 is transmitted through the beamsplitter 12 without any perturbing effects. After being transmitted through the beamsplitter 12, the collimated light beam reaches the image lens 18.

The image lens 18 may be any of a variety of conventional lenses, such as a converging lens, for creating an image of a surface. Although the schematic of FIG. 1 only shows an image lens 18, a typical microscope will have a series of relay optics as is known in the art. The relay optics are not shown for purposes of simplicity. In the configuration shown in FIG. 1, the image lens 18 projects the illumination light beam onto an image plane 20 positioned at the focal distance f2 from the image lens 18. A lens such as the image lens 18 (or the objective lens 14) has a predetermined focal distance (f) based upon its magnification power. In one example of an image lens suitable with the present invention, the focal distance is between 160 mm to 250 mm. The focal distance of the image lens may be much smaller or larger than this range however.

The focal distance (f) corresponds to the distance from the lens at which a collimated light beam passing through the lens will be properly focused, i.e., the diameter of the light beam will be at a minimum. For example, the objective lens 14 shown in FIG. 1 has a focal distance of f1. Therefore, a sample plane 16 located at a distance f1 from the objective lens 14 will have the collimated illumination light beam 22 from the beamsplitter 12 focused on the sample plane as shown in FIG. 1. Because the sample plane 16 is located at exactly the focal distance f1 from the objective lens 14, the reflected light beam from the surface will be recollimated as it passes back through the objective lens 14 along the first optical axis 56 toward the image lens 18. The reflected illumination light beam directed by the image lens 18 (moving to the right in FIG. 1) will then be focused on the image plane 20 located at the focal distance f2 (of image lens 18) from the image lens 18. Therefore, when the sample plane 16 is at the focal distance f1 from the objective lens 14, the resulting image from the image lens 18 will be properly focused.

Typically, however, the sample plane 16 is not initially positioned at exactly the focal distance from the objective lens 14. Even if the sample plane is initially positioned at the desired distance from the objective lens, external factors such as thermal effects or vibrations may cause relative movement between the sample plane and the objective lens. When the plane 16 is located at position other than the focal distance f1 away from the objective lens 14 (i.e., moved to the left or right from the position shown in FIG. 1), the objective lens will not focus on the sample plane. For example, FIG. 2 shows the sample plane 16 being located at a greater distance (f1 plus d1) from the objective lens 14 compared to the distance in FIG. 1. In this new position, the surface of the sample has moved an additional distance d1 from the position shown in FIG. 1. When the sample plane is not located at the focal distance f1 from the objective lens, the illumination light beam will be focused by the objective lens 14 at the desired reference plane 23 for the sample (shown in dashed lines in FIG. 2) located f1 from the objective lens 14, instead of on the sample plane 16. The desired reference plane 23 for the sample (shown in FIG. 2) is positioned at exactly the focal distance f1 from the objective lens 14, and therefore corresponds to the position at which the diameter of the illumination light beam from the objective lens 14 is at a minimum.

However, it is desired that the diameter of the illumination light beam is at a minimum at the actual plane of sample plane 16 (shown as a solid line), not at a reference plane 23 spaced from the sample plane. Therefore, it is ultimately desirable for the sample plane 16 to be placed at the desired reference plane 23 in order for proper focusing to occur. A method and apparatus for obtaining such focusing will be described later.

In FIG. 2, the sample plane 16 is located an additional distance d1 from the desired reference plane 23 (shown in dashed lines). This movement of d1 may be caused by a variety of factors. As seen in FIG. 2, the diameter of the illumination light beam is at a minimum at the desired reference plane 23 and thus strikes the sample plane 16 at a position beyond the distance f1 from the objective lens 14. The illumination beam 22 will then reflect off of the sample plane as reflected light beam 24. Because the illumination light beam 22 did not strike the sample plane 16 at a single point or minimum diameter position (as done in FIG. 1), the outer boundaries of the reflected light beam 24 will be outside of the outer boundaries of the illumination light beam 22 going toward the sample plane 16. As shown in FIG. 2, after passing back through the objective lens 14, the reflected light beams 24 will no longer be collimated.

The reflected light beams 24 will then transmit through the beamsplitter 12 toward the image lens 18 along the first optical axis 56. Because the reflected light beams are not collimated, the image lens 18 will then project the reflected light beams 24 so that they intersect at an image plane 20 which is not at the proper focal distance f2 from the image lens 18. The plane located at the focal distance f2 from the image lens is referred to as the "desired" reference plane for the image plane. The distance between the desired reference plane 26 for the image plane (shown in dashed lines) and the actual position of image plane 20 (shown as a solid line) is represented as d2 in FIG. 2 and throughout the specification. As shown in FIG. 1, when the sample plane is properly positioned relative to the objective lens, the actual position of the image plane 20 is identical to the desired reference plane 26.

An image forming device such as a charge couple device (CCD) or camera can be positioned at the desired reference plane 26 of the optical system 10. Alternately, an eyepiece for observing the image may be positioned at the desired reference plane 26 so that a viewer's eye aligns with the desired reference plane 26. Therefore, in order to properly focus the optical instrument it is desirable that the reflected beam 24 be directed so that the beams intersect at a point on the desired reference plane 26 (as shown in FIG. 1). For the system shown in FIG. 2, where the sample plane 16 is displaced d1 from the properly focused position (a focal distance f1 from the objective lens), there will be a corresponding displacement d2 of the image plane 20 from the desired reference plane 26 of the microscope. Therefore, the corresponding image will be out of focus because it is not at the proper focal distance f2 from the image lens 18.

Autofocusing systems consistent with the principles of the present invention provide quick and accurate automatic focusing onto the sample plane. The autofocusing system includes an autofocusing detection system for directly determining the displacement of the actual image plane from the desired reference plane of the image plane of the optical system. The displacement generally corresponds to the amount that the image is out of focus. According to one aspect of the present invention, the need for a time consuming evaluation of the characteristics of a plurality of images is eliminated by directly determining the distance that the image is out of focus. As a result, the microscope can be quickly and efficiently adjusted so that the image is properly focused. The autofocusing system of the present invention further includes a focusing correction system for adjusting the distance between the objective lens and the sample plane so that the microscope is quickly focused on the sample plane.

Figure 3A:
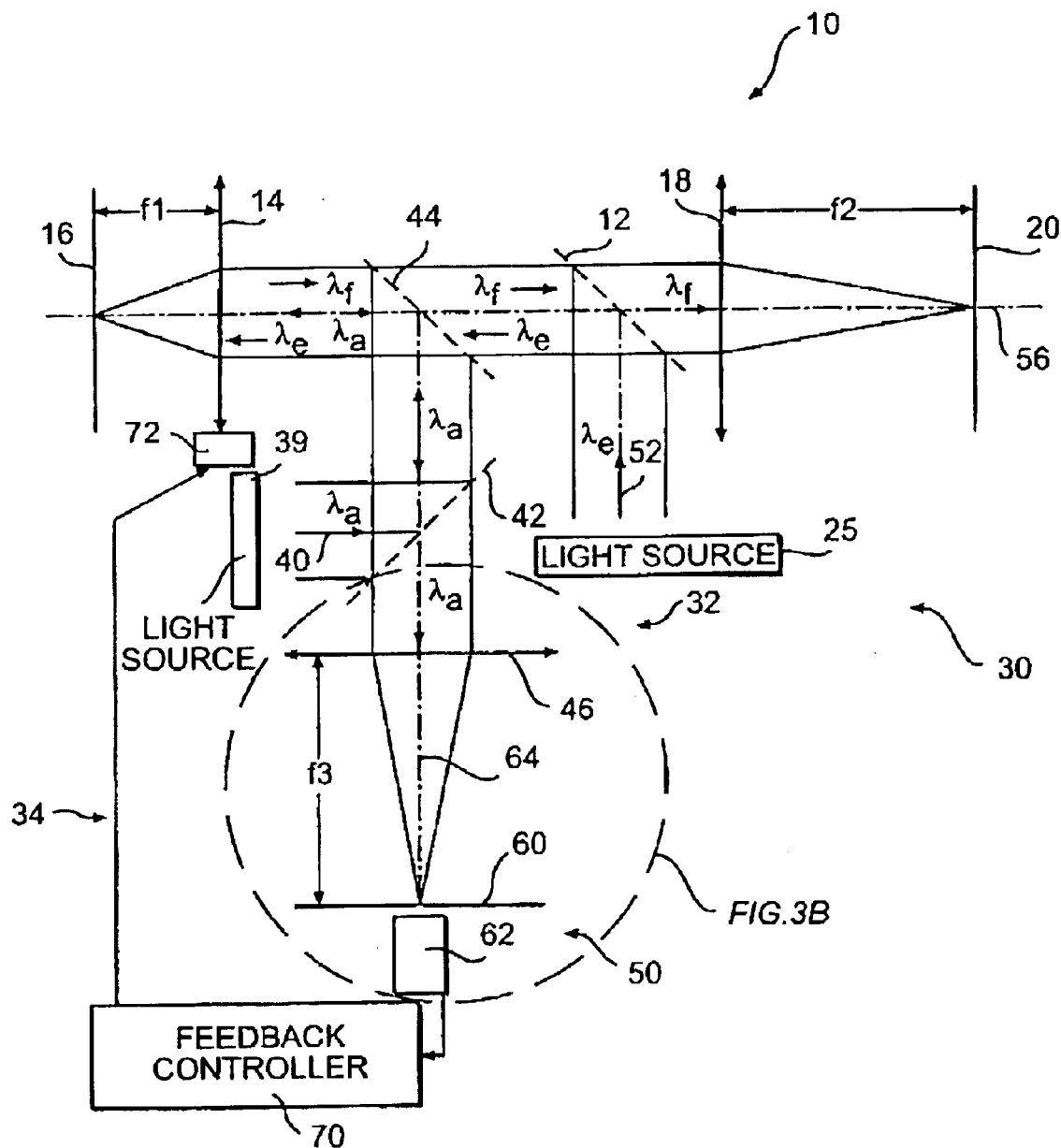
FIG. 3A illustrates a microscope with the optical system of FIG. 1 and an autofocusing system according to an embodiment of the present invention.

A first example of an apparatus according to the present invention for automatically focusing an optical instrument onto a sample plane is shown in FIGS. 3A, 3B, and 3C. As embodied herein and shown in FIGS. 3A–3C, the apparatus 30 for automatically focusing an optical instrument onto a sample plane includes the optical system 10 for forming an image (previously described in FIGS. 1–2), an autofocusing detection system 32, and a focusing correction system 34. As shown in FIGS. 3A–3C, the apparatus 30 includes an optical system 10 for forming an optical image of a sample to be observed. The optical system 10 includes beamsplitter 12, objective lens 14, image lens 18, image plane 20, and illumination light source 25 substantially as previously described in the discussion above for FIGS. 1–2. The principles of the optical system 10 in FIGS. 3A–3C operate under the same principles as previously described for FIGS. 1–2. The components of the optical system 10 will be described in greater detail below in relation to the autofocusing detection system 32 and focusing correction system 34.

As embodied herein and shown in FIGS. 3A–3C, an autofocusing detection system 32 is provided that includes a light source 39 for generating autofocusing light beams 40, a first autofocusing beamsplitter 42, and a second auto focusing beamsplitter 44. The autofocusing system 32 further includes a detection system lens 46 for directing and returning an autofocusing light beam and a detection device 50 for determining the amount of displacement of the image from a desired focused reference plane. The detection device 50 may be any number of devices such as those shown in FIGS. 3A–3C and the other embodiments of the invention.

As embodied and shown in FIGS. 3A–3B, light source 39 generates an autofocusing light beam 40 used in the autofocusing detection system 32. The light source 39 may be any suitable light source such as a lamp or laser. If a laser is selected, a diode laser or HeNe laser may be used for light sources 39, although any number of other laser types may also be used with the present invention. Further, although the autofocusing light beam 40 is shown as being collimated in FIG. 3A, the autofocusing light beam could alternately be either convergent or divergent. The beam is shown as collimated in order to simplify the discussion.

In the example shown in FIG. 3A, the autofocusing light beam has a wavelength of $\lambda a$. The wavelength for the autofocusing light beam is preferably selected to be different than the wavelength of the illumination light beam 52. In most instances, it is preferred that the autofocusing light beam has a longer wavelength than the illumination light beam. For the purposes of the description below, the light sources and beams will be described in relation to fluorescent imaging spectroscopy, although the present invention is suitable with a large number of other applications besides fluorescent imaging spectroscopy. In fluorescent imaging, the illumination light beam 52 has an excitation wavelength of $\lambda e$ and is used for generating the image in the optical system 10, in a manner similar to that discussed with regard to FIG. 1. The wavelengths of the autofocusing light beam 40 and illumination light beam 52 are selected to be different from one another so that the autofocusing light beam 40 does not perturb or interfere with the illumination beam 52 used for creating the image.

In a microscope using fluorescent imaging, the wavelength of the illumination light beam 52 is preferably selected to be as narrow as possible and within the absorption band of the fluorescent sample under study. As the illumination light beam strikes the surface, a fluorescent light beam having a wavelength $\lambda f$ is created. Preferably, the wavelength of the fluorescent beam is different than the wavelength of the illumination light beam. The difference between the wavelengths, in one example, may be as small as 50 nm, preferably 10 nm or smaller. Any light of the excitation beam should not be allowed to enter the image lens 18. Therefore, in the example shown in FIG. 3A, the beam splitter 12 is configured to block all light with a wavelength $\lambda e$, while allowing light of the fluorescence wavelength $\lambda f$ to be transmitted there-through.

As discussed above, the autofocusing light beams should be selected to have a wavelength ($\lambda a$) different than the excitation wavelength ($\lambda e$) and the fluorescent wavelength ($\lambda f$). One particular example will be shown for purposes of illustration only. In the case of a sample that absorbs a wavelength of approximately 510 nm and fluoresces at approximately 550 nm, the excitation beam can be selected to be an $Ar^+$ ion laser with a wavelength of 514 nm. The wavelength of the autofocusing light beam can be selected to be greater than approximately 600 nm. This one example of the wavelengths is for purposes of illustration only, and does not limit the present invention. By using different wavelengths, the present system is capable of simultaneously determining the amount that the system is out of focus and creating the image of the surface. The ability to perform both of these processes simultaneously enhances the speed and efficiency of the autofocusing apparatus.

In the example shown in FIGS. 3A–3C, the autofocusing light beam source 39 generates and projects the autofocusing light beam 40 in a first direction parallel to the first optical axis 56. The autofocusing light beam 40 strikes the first beamsplitter 42 of the autofocusing detection system and is reflected along a second optical axis 64 to the second beamsplitter 44 of the autofocusing system. Alternately, the apparatus could be configured so that the autofocusing light beam source 39 generates the autofocusing light beam 40 directly onto the second beamsplitter 44, without needing the first beamsplitter 42. In another possible configuration, the light source 39 for the autofocusing beam could generate the autofocusing light beam 40 directly to the objective lens 16.

The beam splitters 42, 44 used in the present invention may be of any conventional type known in the art. For example, the beam splitters 42, 44 may be partially reflecting conventionally beam splitters. Beam splitter 44 is preferably configured to transmit all of the illumination light beam of wavelengths $\lambda e$ and $\lambda f$ while reflecting the autofocusing light beams of wavelength $\lambda a$. In one example, beam splitter 42 is preferably configured to use a polarizing beam splitter and a ¼ wavelength plate. As shown in FIG. 3A, upon striking the second beamsplitter 44, the autofocusing light beam 40 is reflected toward the objective lens 14 along the first optical axis 56. The beamsplitter 44 is configured to reflect the autofocusing light beam of wavelength $\lambda a$. If the beams are operated simultaneously, the beam splitter 44 also allows the reflected illumination light beam 52 to pass there-through as previously described.

The autofocusing light beam travels to the objective lens 14 along a first optical axis 56. The objective lens 14 may be any type of microscope objective lens. The objective lens 14 has a focal distance f1, which is a function of the magnification power of the objective lens. For most applications, the effective focal distance f1 will typically range between 40 mm and 1 mm. However, objective lenses with focal distances outside of this range are also suitable with the present invention. The objective lens 14 directs the autofocusing light beam of wavelength $\lambda a$ onto the sample plane 16 located at a focal distance f1 from the objective lens. In the embodiment shown in FIG. 3A, the sample plane 16 is located at the focal distance f1 away from the objective lens, therefore, the resulting image of the sample plane will be properly focused due to the properties of the optical system (including that of the image lens 18).

The autofocusing light beam 40 from the objective lens 14 is then at least partially reflected off of the sample plane 16 and directed back to the objective lens 14. The reflected autofocusing light beam with a wavelength $\lambda a$ is then directed by the objective lens 14 along the first optical axis 56 to the second autofocusing beamsplitter 44. The second autofocusing beamsplitter 44 reflects the autofocusing light beam of wavelength $\lambda a$ toward the first autofocusing beamsplitter 42 (in a downward direction along second optical axis 64 in FIG. 3A). The first autofocusing beamsplitter 42 permits the autofocusing light beam reflected from the second autofocusing beamsplitter 44 to be transmitted through without any perturbing effects. The autofocusing light beam 40 is thereby transmitted to the detection system lens 46 and autofocusing detection device 50. The method and apparatus for detecting the amount that the image is out of focus will be discussed below in greater detail.

As previously discussed, the optical system for creating an image includes the source of the illumination light beam for illuminating the sample plane. In a fluorescent imaging system, the illumination light beam has a wavelength $\lambda e$ to generate the fluorescence of the sample plane. As shown in the example of FIG. 3A, the beamsplitter 12 of the optical system reflects the illumination light beam 52 toward the sample plane 16 along the first optical axis 56. The second autofocusing beamsplitter 44 is configured to permit the illumination light beam of wavelength $\lambda e$ to be transmitted through it to objective lens 14. The objective lens 14 then directs the illumination light beam to a point at a distance f1 from the objective lens 14. The illumination light beam is configured to intersect at a reference plane corresponding to the focal distance f1 from the objective lens. In FIG. 3A, because the sample plane is located f1 from the objective lens, the illumination light beam will strike a single point on the sample plane and reflect off as shown in FIG. 3A. As the illumination light beam reflects off of the sample plane it is converted into an illuminated fluorescent beam (in a fluorescent imaging example), such as a fluorescent light beam having a wavelength of $\lambda f$. This wavelength is preferably sufficiently different than the autofocusing wavelength such that interference does not occur between the illuminated beam and the autofocusing light beam.

The fluorescent light beam from the sample plane 16 has a wavelength $\lambda f$ and passes through the objective lens (as it moves to the right in FIG. 3A). In the example shown in FIG. 3A, the fluorescent light beam is collimated as it passes through the objective lens, and directed toward the second autofocusing beamsplitter 44. The second autofocusing beamsplitter 44 is configured to permit the fluorescent light beam to pass through. The fluorescent light beam then passes through the beamsplitter 12 of the image system along the first optical axis 56. The image lens 18 then focuses the fluorescent light beam onto an image plane 20 at a focal distance f2 from the image lens where the image is formed. In the example shown in FIG. 3A, because the sample plane 16 is placed exactly the focal distance f1 from the objective lens, the image plane 20 is coplanar with the desired reference plane 26 on which the properly focused image is formed. As previously discussed, the desired reference plane typically corresponds with a surface on which may include an image detecting device such as a CCD camera or eyepiece for directly observing the image.

As previously explained, the present invention incorporates an apparatus and method for directly determining the amount that an image is out of focus without requiring the analysis of the characteristics of a plurality of images. The apparatus and method of the present invention directly determines the displacement of the image from its properly focused position, and then adjusts the optical system to obtain a focused image. The autofocusing system of the present invention includes an autofocusing detection device for directly determining the amount that the image is out of focus and includes a focusing correction system.

The apparatus may include one of several different types of autofocusing detection devices. FIG. 3A shows an apparatus having one particular type of autofocusing detection device according to an aspect of the present invention. The autofocusing detection device 50 of the example shown in FIG. 3A includes an iris 60 positioned at the focal distance f3 from the detection system lens 46. The focal distance f3 of the detection system lens 46 is a function of the size and magnification of the detection system lens 46. The iris 60 may be any type of flat plate or other structure with an aperture to permit light to be transmitted there-through.

When the sample plane 16 is positioned at the proper focusing position (distance f1 from objective lens 14), the iris will allow the autofocusing light beam of wavelength $\lambda a$ (shown as a solid line in FIG. 3B) from the detection system lens 46 to pass through the iris to a light detector 62 without interference. The detection system lens 46 preferably has a focal distance f3 that is suitable so that the autofocusing light beam will be small enough to pass through the iris when the surface is in focus. The autofocusing light beam will be smaller as the focal length is made larger. However, the autofocusing system will be compact and robust with smaller focal distances. Therefore, the selection of the focal distance of the detection system lens is a balance of these considerations. In one typical embodiment of the present invention, the detection system lens 46 has a focal distance between 50 mm to 200 mm. The focal distance may be larger or smaller than this range, however, according to the dimensions and other characteristics. In the embodiment shown in FIG. 3A, the light detector 62 is positioned on the opposite side of the iris 60 with respect to the detection system lens 46 along the second optical axis 64.

During autofocusing, the autofocusing light beam 40 passes though the iris 60 and is transmitted to the detector at a maximum intensity when the sample plane 16 is positioned at the distance f1 from the objective lens. At this position, an image is created at the focal distance f3 from the detection system lens 46. The image is thus created directly on the iris 60 as shown in the solid lines of FIG. 3B. The intensity of the light measured by the light detector 62 is at its peak value because the autofocusing light beam 40 passes substantially through the aperture of the iris 60. At this position, the sample plane is determined to be properly focused by the optical system 10.

When the sample plane 16 is moved from the position shown in FIG. 3A, the autofocusing light beam 40 from the detection system lens 46 (shown in dashed lines in FIG. 3B) will not pass directly through the iris without perturbing effects. The beam will intersect at a point "X" positioned a distance d3 from the iris. Thus, for a given displacement d1 of the sample plane 16 from the desired reference plane (for example, the reference plane 23 at a distance f1 from the objective lens 14 as shown in FIGS. 1–2), there will be a corresponding displacement d3 of the detection image plane 66 from the plane of the iris 60, as best shown in FIG. 3B. When the detection image plane 66 is located at a distance from the iris, the intensity of the light measured by the light detector is less because not all of the autofocusing light beam will pass through the iris aperture.

FIG. 3C shows two graphs representing the method used to calculate d3 by the light detector 60. The top graph (labeled i) illustrates the intensity of the light (I) measured by the detector versus the displacement distance d3. The bottom graph (labeled ii) illustrates the derivative of the intensity of the light (I) measured by the detector versus the displacement distance d3. As shown by the graphs in FIG. 3C, the light measured by the light detector will be at its maximum when the distance d3 is zero. Through the measurements of the light detector 62, the displacement distance d2 is determined based on the intensity of the light beam passing through the iris.

In the FIGS. 3A and 3B embodiment, it may be difficult to distinguish between a negative and positive d3 (i.e., a beam focused either above or below the iris in FIGS. 3A–3C), therefore it is preferable that the system is modulated in order to solve for this potential problem. Consequently, the autofocusing detection system of the example shown in FIGS. 3A–3C preferably modulates the distance d1 with a small amplitude. The modulation results in a change in the intensity of the light, which is proportional to the derivative of the intensity (I). The distance between the sample plane 16 and the objective lens 14 is preferably adjusted so that the change in intensity is zero, as shown in the bottom graph of FIG. 3C. The value for d3 is then sent to a feedback controller as will be described below.

One important aspect of the present invention is that the autofocusing detection system performs the autofocusing based on the calculated value for the displacement d2 of the image plane 20 from the desired image plane 26 (see FIGS. 1–2). The autofocusing detection system directly measures the value for d3. The optical system 10 and the autofocusing system 50 may be configured so that a measurement for d3 can be directly converted into an value for d2. That is, the value for d2 may be set to be directly related to d3. For example, the lenses of the imaging system and autofocusing system may be positioned so that d2 is equal to d3. Alternately the lenses may be positioned so that the value of d2 is proportional to the value of d3. In another possible configuration, the lenses are positioned so that the value for d2 may be directly calculated by an empirical calculation based on d3. In another possible configuration, the value for d2 may be determined based on a set of data points or a map. With each of these options, the measured value for d3 is representative of the value for d2. Therefore, the autofocusing system 50 can detect the amount that the image plane 20 is out of focus without having to analyze the actual characteristics of the image formed on the image surface. This enhances the speed and efficiency of the autofocusing operation of the present invention. The method and structure for focusing the objective lens on the sample plane as a result of the above measurement will be described in greater detail below.

In accordance with present invention, the apparatus includes a focusing correction system 34. As embodied herein and shown in FIGS. 3A, the focusing correction system 34 includes a feedback controller 70 and a focus adjusting device 72. The feedback controller 70 may be an analog or digital feedback controller as is known in the art. The feedback controller 70 receives a signal from the light detector 62 corresponding to the displacement distance d3 and generates a feedback voltage that is then sent to a focus adjusting device 72.

The focus adjusting device 72 may be of several different types. In a preferred embodiment, the focus adjusting device 72 adjusts the position of the objective lens 14 relative to the sample plane 16. In another embodiment, the focus adjusting device 72 adjusts the position of the sample plane 16 relative to the objective lens 14. Either type of device (adjusting the position of the objective lens or adjusting the position of the sample plane) is designed to position the optical system so that the sample plane can be quickly put into focus and a focused image can be taken of the sample plane. A typical device for imparting these type of small displacements is a piezo-positioner. In the example shown in FIG. 3A, the focus adjusting device 72 modifies the position of the objective lens 14 so that it is at the desired focal distance f1 from the sample plane 16. As a result, the image plane 20 of the optical system is placed in focus so that the values for d2 and d3 approach zero. If the autofocusing detection system 50 calculates a value for d3 that is above a predetermined threshold, the focusing correction system 34 can be operated again until the sample plane is placed in focus. This operation is performed in a shorter period of time because the present system does not analyze the characteristics of the image as is done in other systems.

Figure 4A:
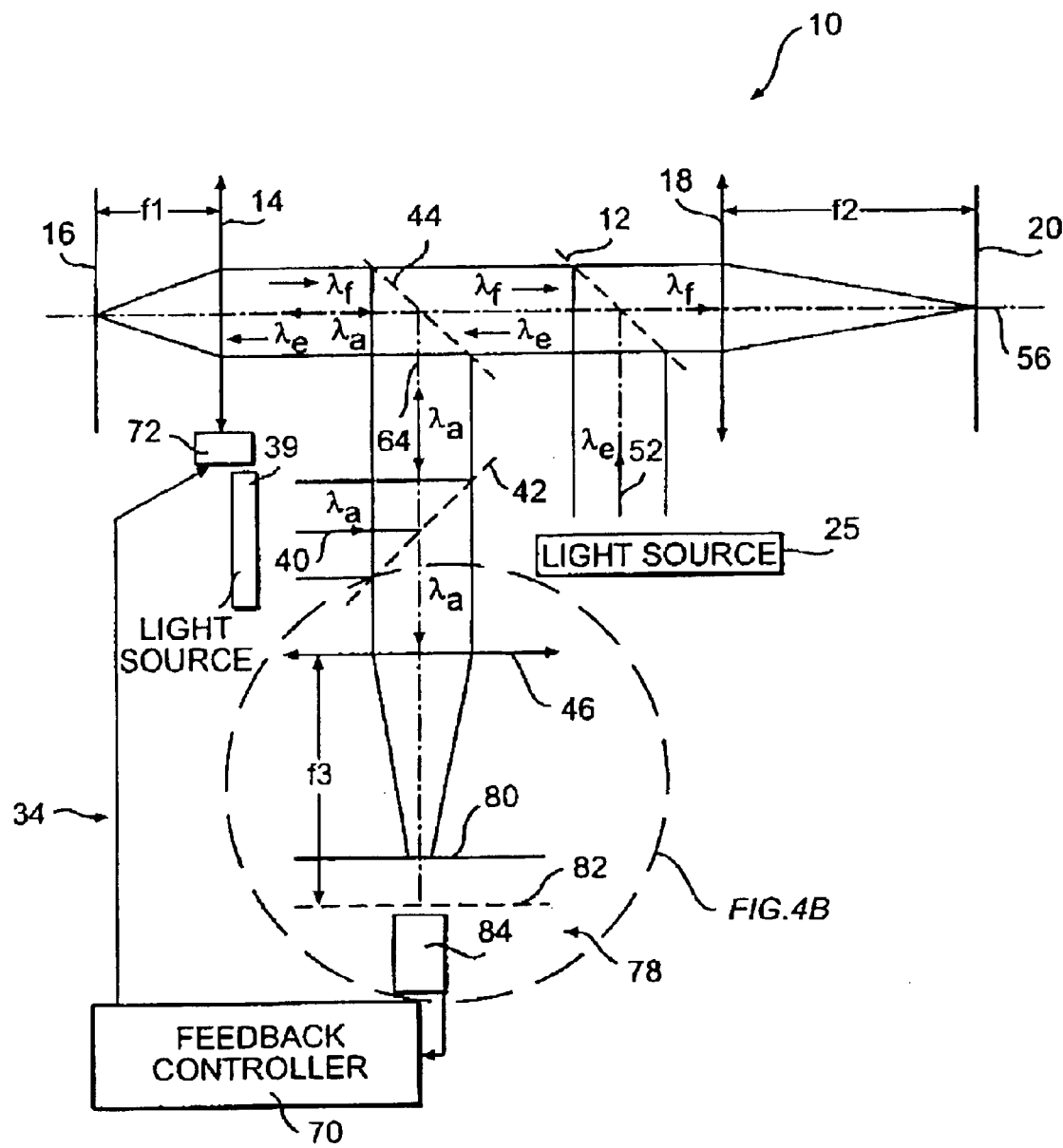
FIG. 4A illustrates a microscope with the optical system of FIG. 1 and an autofocusing system according to another embodiment of the present invention.
Figure 4C:
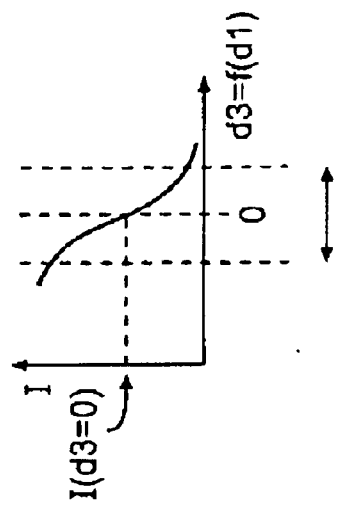
FIG. 4C is a graph of the intensity of light detected by the autofocusing detection device of FIG. 4B at various relative positions between an actual image plane and a desired image plane.
Figure 4B:
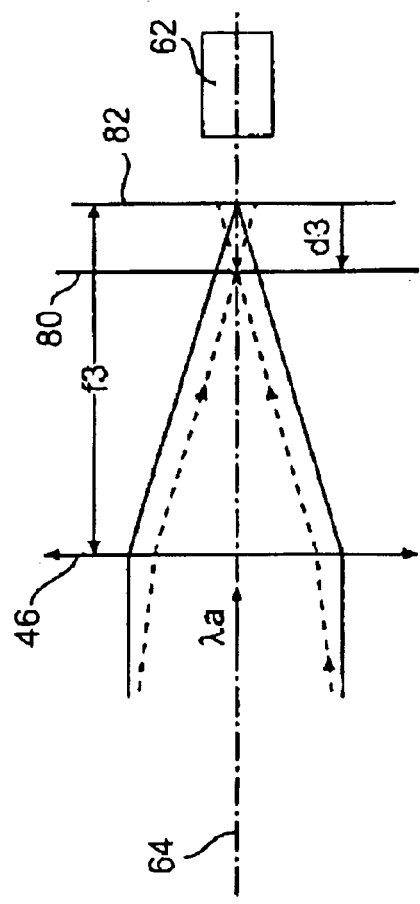
FIG. 4B illustrates an autofocusing detection device of the autofocusing system of FIG. 4A.

Another embodiment of an autofocusing detection device according to the present invention is shown in FIGS. 4A, 4B, and 4C. The structure shown in FIGS. 4A and 4B is similar to the example of FIGS. 3A and 3B except for the positioning of the iris. The discussion below will concentrate on the structure and method that is different than already described in relation to FIGS. 3A and 3B. The autofocusing detection device 78 of the example shown in FIGS. 4A–4C includes an iris 80 and light detector 84. In the autofocusing detection device 78 of FIGS. 4A–4C, the iris 80 is placed at a distance not corresponding to the focal length f3 from the detection system lens 46. That is, the iris is spaced from the reference plane 82 (shown in dashed lines in FIG. 4A), which is located at the focal distance f3 from the detection system lens 46. As seen in FIG. 4B, the autofocusing device is designed so that the iris 80 is placed parallel to the reference plane 82 and separated by a distance d3.

As shown in FIG. 4B, the iris 80 is positioned at a distance of f2 minus the distance d3 from the detection system lens 46. In general, in the system of FIGS. 4A–4C, when the light detector 84 measures a certain predetermined intensity, the surface of the sample will be in focus. However, if there are fluctuations in the reflectivity of the surface or if the power of the light sources fluctuate, the intensity measured by the light detector may fluctuate even though the sample plane is still in focus. The accuracy of the autofocus detection system thus may be limited by the stability of the light sources and by the uniformity of the sample plane reflectivity. However, even if there are fluctuations in the stability of the light sources or in the surface reflectivity, the ratio between the light power measured by the detector and the light source power is not affected by these fluctuations.

Figure 4D:
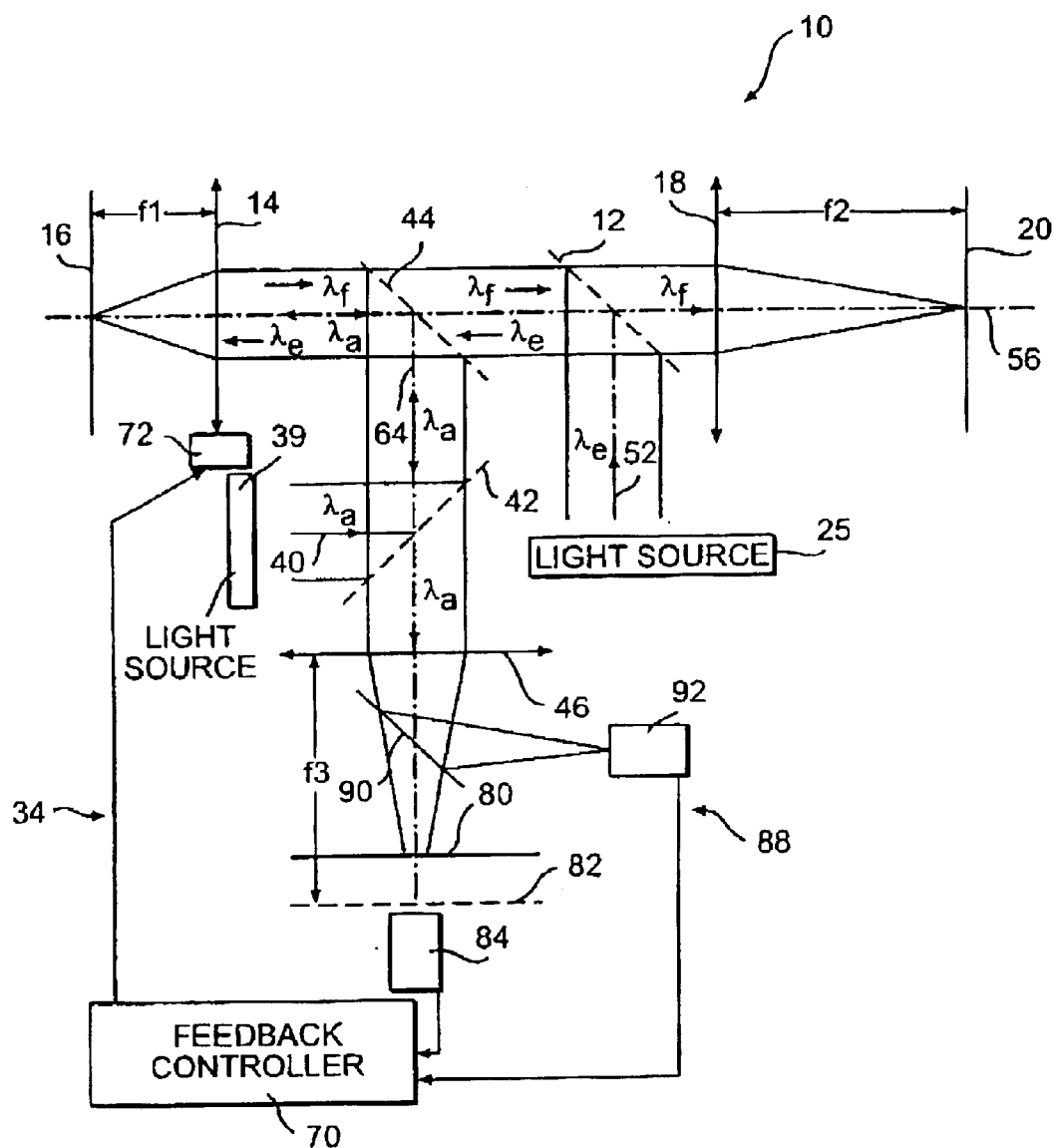
FIG. 4D illustrates a variation of the microscope of FIG. 4A with a modified autofocusing detection system.

In order to minimize any potential problems due to these fluctuations, the autofocusing system of the second example may further include a third autofocusing beamsplitter 90 and a second light detector 92, as shown in FIG. 4D. As shown in FIG. 4D, the third autofocusing beamsplitter 90 is positioned between the detection system lens 46 and the iris 80 along the second optical axis 64. The second light detector 92 is positioned offset from the second optical axis 64 as shown, for example, in FIG. 4D. The second light detector 92 could also be arranged at other locations.

The third autofocusing beamsplitter 90 is configured so that it splits off a certain percentage of the autofocusing light beam intensity to the second light detector 92, for example, 50%. The intensity (I2) of the light split off to the second light detector 92 is proportional to the total intensity reflected by the plane 16. The remaining 50% of the light goes to the iris 80. A fraction of this remaining 50% going to the iris 80 is detected by the first light detector 84. The ratio of the light intensity (I1) detected by the first light detector 84 to the light intensity (I2) detected by the second light detector 92 is then used to directly calculate the value d3. By this arrangement, fluctuations in the intensity of the light beams and reflectivity of the sample plane will be accounted for. Alternately, the iris could be replaced by a diode array positioned where the iris is shown in FIGS. 4A and 4B. The autofocusing detection system 32 includes a focusing correction system 34 similar to that described for FIGS. 3A–3C.

Figure 5:
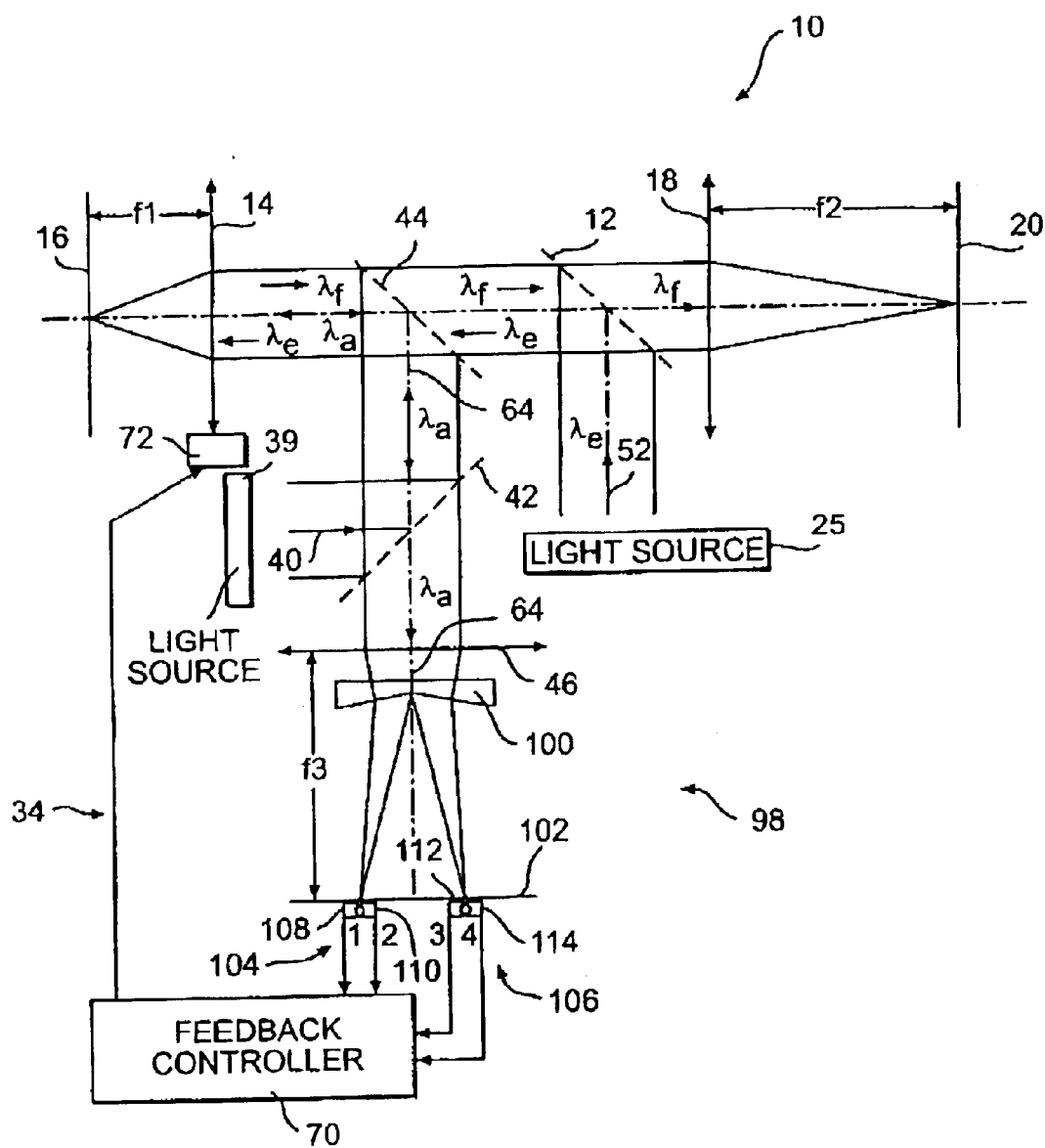
FIG. 5 illustrates a microscope with the optical system of FIG. 1 and an autofocusing system according to another embodiment of the present invention.

Another embodiment of an autofocusing detection device according to the present invention is shown in FIGS. 5–7. The discussion below will concentrate on the structure and method that is different than already described in relation to FIGS. 3A and 3B. The autofocusing detection device 98 of FIGS. 5–7 includes a prism or lens for deflecting the returning autofocusing light beam of wavelength λa to points on a surface located a distance f3 from the detection system lens. As shown in FIGS. 5–7, a prism 100 is provided between the detection system lens 46 and a detection surface 102. The prism 100 deflects the returning autofocusing light beam onto the detection surface 102 located at the focal distance f3 from detection system lens 46. The focal distance f3 shown in FIG. 5 corresponds to the focal distance of the combination of the detection system lens 46 and prism 100. Selection of the focal distance f3 will be discussed below.

The autofocusing detection system 98 further includes diode pairs. Diode pairs such as 104 and 106 may be positioned on both sides of the optical axis 64 on the detection surface 102, as shown in FIG. 5. In the example shown in FIGS. 5–7, the first diode pair 104 includes a first diode 108 and a second diode 110, and the second diode pair 106 includes a third diode 112 and a fourth diode 114. In FIGS. 5–7, the first diode pair 104 including the first and second diodes 108 and 110 are positioned on the left side of the second optical axis 64 as shown in the FIG. 5, and the second diode pair 106 including the third and fourth diodes 112 and 114 are positioned on a right side of the second optical axis 64.

Figure 6A:
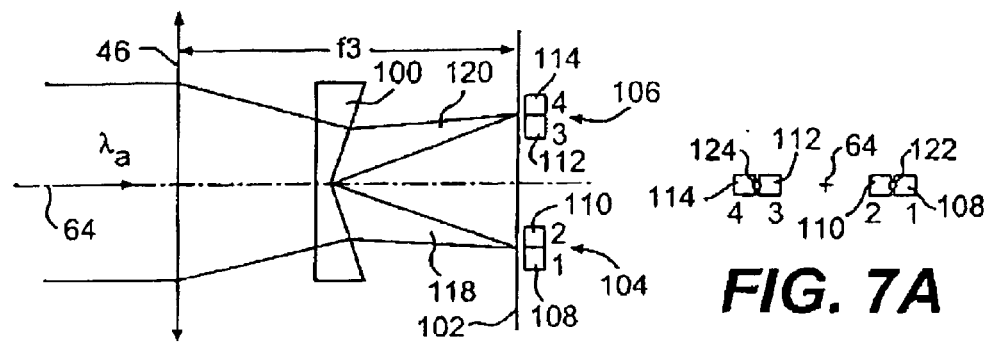
FIGS. 6A, 6B, and 6C illustrate an autofocusing detection device of the autofocusing system of FIG. 5 with the object plane in focus, the object plane too far from an objective lens, and the object plane too close to the objective lens, respectively.

FIGS. 5, 6A, and 7A illustrate aspects of the autofocusing detection device 98 when the sample plane 16 is located at the focal distance f1 from the objective lens so that the resulting image of the image plane 20 is in focus. When the sample plane 16 is properly located for focusing, the autofocusing light beam being directed towards the detection system lens 46 is typically collimated as shown in FIG. 6A. The detection system lens 46 then projects the autofocusing light beam to prism 100 such as that shown in FIGS. 5 and 6A. In the example shown, the autofocusing light beam is divided by the prism 100 into a first light beam 118 and second light beam 120.

When the plane 16 is properly positioned for focusing, the first light beam 118 will focus exactly on the detection surface 102 located at the focal distance f3 from the detection system lens 46, as shown in FIG. 5 and 6A. The first light beam 118 will create a first light spot 122 halfway between the first diode 108 and the second diode 110, as best shown in the front view of the diodes in FIG. 7A. The second light beam 120 will create a second light spot 124 halfway between the third diode 112 and the fourth diode 114, as best shown in FIG. 7A. The light spots on the diodes will be relatively small because each light beam is at a minimum at the detection surface 102. The sample plane will be properly focused when the light spots are created as shown in FIG. 7A.

Figure 6B:
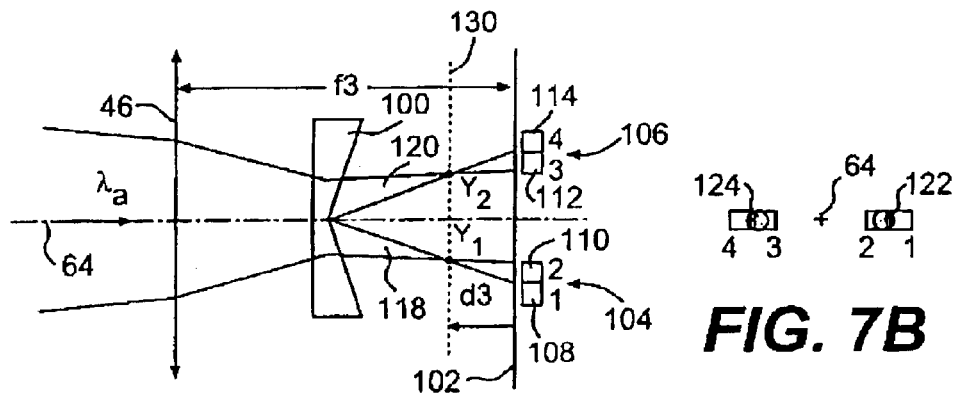

FIGS. 6B and 7B illustrate aspects of the detection system when the sample plane 16 is located more than the focal distance f1 from the objective lens 14. When the sample plane 16 is located too far from the objective lens, the returning autofocusing light beam will typically be non-collimated (as shown in FIG. 6B). The detection system lens 46 then projects the autofocusing light beam to the prism where the beam is divided into the first and second light beams 118 and 120, respectively. In the embodiment shown in FIG. 6B, the first light beam 118 is at a minimum diameter and forms an image plane 130 (shown in dashed lines) at a point y1 located at a distance d3 from the detection surface 102 (also referred to as the desired image plane). Because the first light beam 118 is not at a minimum diameter at the detection surface 102, the light spot 122 formed on the diodes is relatively larger than the light spot shown in FIG. 7A. As shown in FIG. 6B and 7B, the second light beam 120 is at a minimum diameter at image plane 130 at a point y2 located at the distance d3 from the detection surface 102. As shown in FIG. 7B, the light spots 122 and 124 will move inward relative to the light spots of FIG. 7A.

When the sample plane is too far from the objective lens as described above, the light spots 122 and 124 are formed primarily on the second diode 110 and third diode 112, respectively, as best shown in FIG. 7B. The autofocusing detection system measures the intensity value at each of the diodes and determines the displacement value d3 of the autofocusing light beam from the reference surface 102. The feedback controller 70 then sends a feedback voltage signal to the focus correction system 72 to adjust the distance between the objective lens 14 and the sample plane 16 as previously discussed. The plane 16 will be properly focused when the sum of the intensity measured at the first and fourth diodes is equal to the sum of the intensity measured at the second and third diodes.

Figure 6C:
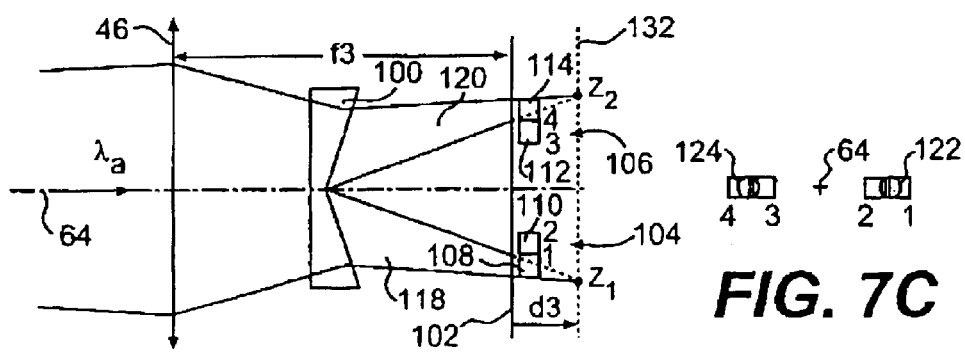

FIGS. 6C and 7C illustrate aspects of the autofocusing detection device 98 when the plane 16 is located less than the focal distance f1 from the objective lens 14. When the surface is located too close to the objective lens, the returning autofocusing light beam will also typically be non-collimated (as shown in FIG. 6C). In the embodiment shown in FIG. 6C, the first light beam 118 is at a minimum diameter and forms an image plane 132 at a point z1 located at a distance d3 behind the detection surface 102 (desired image plane). The light spot 122 formed on the diodes is relatively larger than the light spot shown in FIG. 7A because light beam 118 is not at a minimum diameter yet when it strikes the detection surface 102. The second light beam 120 intersects and forms an image plane at a point z2 also located at the distance d3 behind the detection surface 102 as shown in FIG. 7C. As shown in FIG. 7C, the light spots 122 and 124 will move outward from the second optical axis 64 relative to the light spots of FIG. 7A. The light spots 122 and 124 are formed primarily on the first diode 108 and second diode 114, respectively, as best shown in FIG. 7C.

In the arrangement discussed above, the focal distance of the detection system lens 46 and prism 100 should be selected so that the light spots 122 and 124 are detectable by the diodes. The light spots should be suitably sized so that the diode pairs are able to take accurate readings of the light intensity. In one typical diode arrangement, the light spots will be detectable if they have a size of approximately 10 $\mu$m. Diode arrays with a pixel size of approximately 5 $\mu$m are known. In applications with fragmented diode arrangements such as shown in FIGS. 5–7 (and FIG. 8), beam displacements of the order of 0.1 $\mu$m are measurable. This corresponds to an accuracy in the focal distance f1 and positioning of the sample plane of less than 1.0 $\mu$m in one example of the autofocusing system.

The focusing correction system 34 of FIGS. 5–7 will function as previously described in order to quickly focus the optical system on the sample plane 16 and obtain a focused image.

Figure 8A:
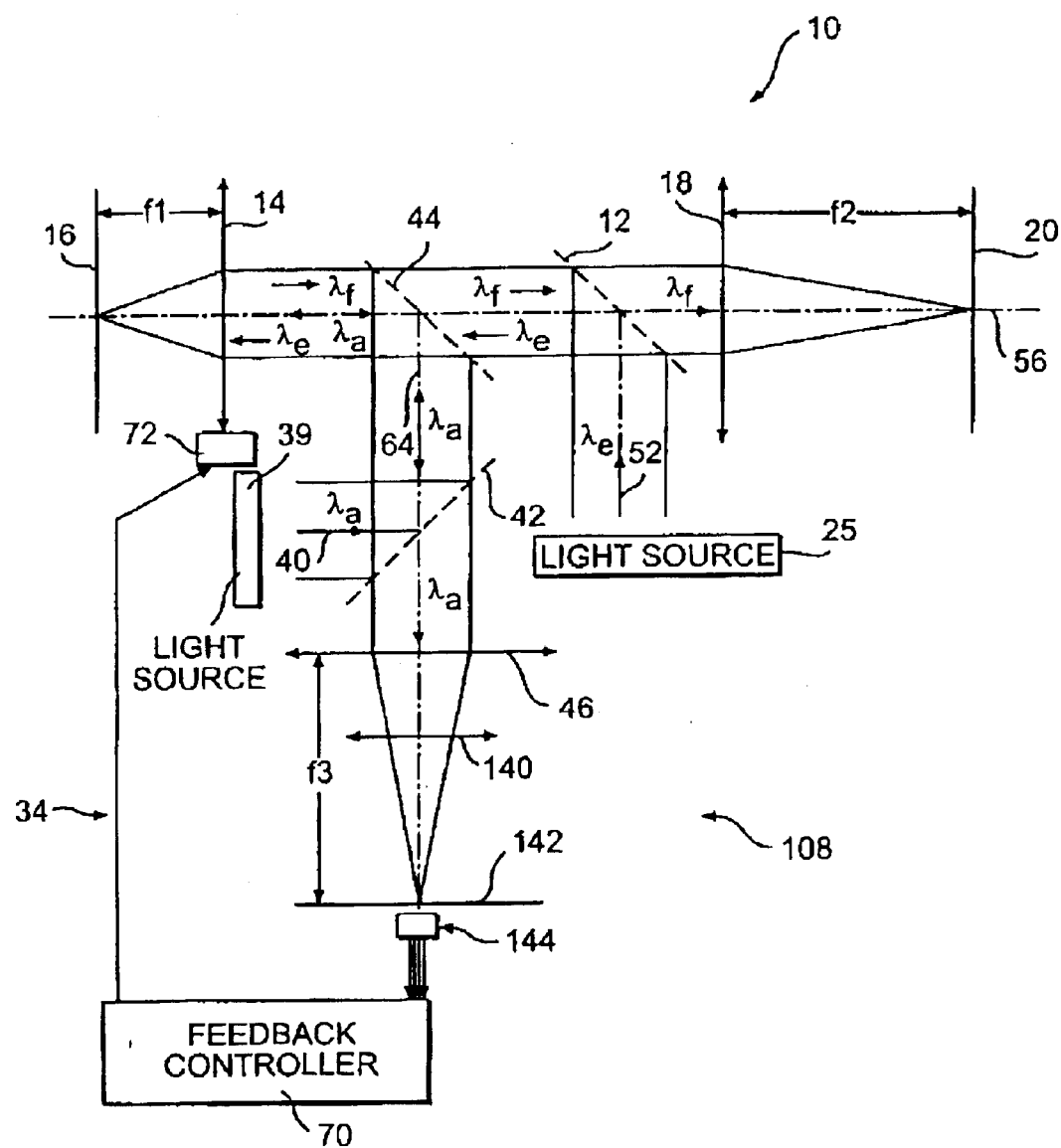
FIG. 8A illustrates a microscope with the optical system of FIG. 1 and an autofocusing system according to another embodiment of the present invention.
Figure 8B:
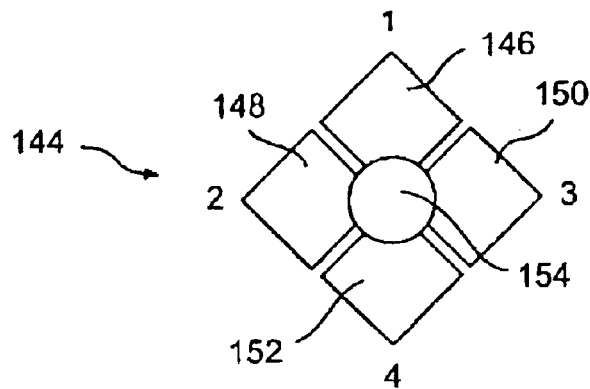
FIGS. 8B, 8C, and 8D illustrate the position of light dots formed on diodes of the autofocusing detection device of FIG. 8A with the object plane in focus, the object plane too close to the object lens, and the object plane too far from the objective lens, respectively.

Another embodiment of an autofocusing detection device according to the present invention is shown in FIGS. 8A–8D. In this example, the autofocusing detection system 108 includes a detection system lens similar to that previously described, as well as a cylindrical lens, and a quad photo diode. As embodied herein and shown in FIGS. 8A–8D, a cylindrical lens 140 is placed between the detection system lens 46 and a detection surface 142 with a quad photo diode 144. The detection surface 142 is preferably located at exactly the focal distance f3 of the detection system lens 46. As illustrated in FIG. 8B, the quad photo diode 144 includes first, second, third, and fourth diode segments 146, 148, 150, and 152, respectively. The detection system lens 46 and cylindrical lens 140 project the autofocusing light beam onto the detection surface 142 to form a light spot 154 on the quad diode 144 located on the detection surface 142.

Figure 8C:
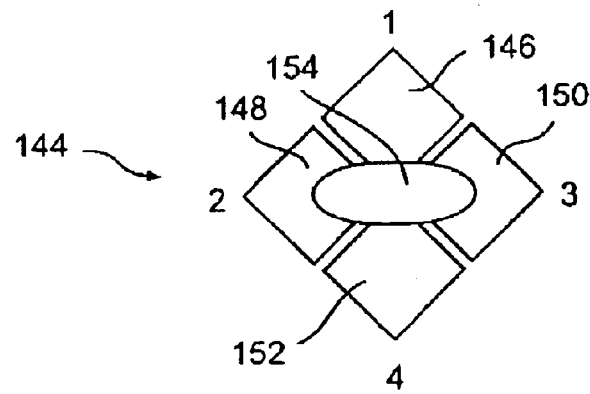

The quad diode 144 determines the displacement d3 of the image relative to the detection surface 142 by measuring the light intensity at each of the four diode segments 146, 148, 150, and 152. The cylindrical lens 140 changes the shape of a light spot 154 depending on the position of the sample plane relative to the objective lens. FIG. 8B illustrates the position of the light spot 154 when the sample plane 16 is properly positioned at the distance f1 from the objective lens 14. The light spot will be located substantially in the center of the four diodes. FIG. 8C illustrates the position of the light spot when the sample plane 16 is positioned at a distance less than the focal distance f1 from the objective lens 14. The light spot will be ellipsoidal, with the majority of the light spot being located on the second diode segment 148 and third diode segment 150, as shown in FIG. 8C. Based on the measured intensity of the diode segments, the feedback controller 70 calculates the distance d3 of the image relative to the detection surface 142.

Figure 8D:
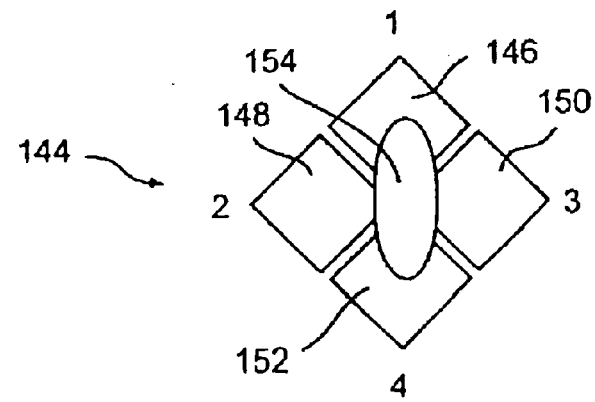

FIG. 8D illustrates the position of the light spot when the sample plane is positioned at a distance greater than the focal distance f1 from the objective lens 14. The light spot will be ellipsoidal, with the majority of the light spot being located on the first diode segment 146 and fourth diode segment 152.

In this example, the feedback controller 70 generates a signal to be sent to the focus adjusting device for controlling the distance between the objective lens 14 and the sample plane 16 in a manner similar to that described for the first three examples.

The autofocusing system of the present invention is suitable for a wide range of applications besides the examples described above. The selection and arrangement of the light sources depends on the kind of microscopy which is chosen. Although the autofocusing system described above is primarily discussed in relation to fluorescent microscopy, the present invention is also suitable with other types of microscopy such as trans-illumination, and luminescence imaging microscopy.

In trans-illumination microscopy, the source of illumination will enter from the left side of the sample plane in a manner known in the art. The beam splitter 12 as shown in the figures will no longer be needed. The illumination source may be a lamp with a broad spectrum (i.e., visible spectrum), a lamp filtered by a narrow bandpass filter, or a laser beam. In a trans-illumination system, it may be desirable to add appropriate filters between beamsplitter 44 and image lens 18 in FIG. 3A. This help prevent any of the autofocusing light beam from leaking through the beamsplitter 44. When visible light is chosen as the excitation beam, the light beam of the autofocusing system can be chosen in the infrared range. In one example having a narrow excitation spectrum around 550 nm, a light beam of approximately 633 nm can be used for the autofocusing system. These values are shown for purposes of illustration only.

In luminescence imaging microscopy, the object emits light without the need of excitation beam. As previously described, a beam splitter such as beam splitter 12 in FIG. 3A is no longer needed. The wavelength of the autofocusing light beam is preferably chosen to be far enough from the luminescence wavelength of the sample plane. In such an arrangement, ambient light may assist in the illumination of the surface. The object itself may be referred to as being the source of illumination in a luminescence imaging microscopy.

As previously discussed, a lamp or laser is typically used as the illumination light source. If a lamp is chosen, filters are added to select the spectrum necessary for the application. If a laser is chosen, the type of laser depends on the wavelength and power needed for the specific application. Lasers especially suited for the present invention include, for example, $Ar^+$ and $Kr^+$ lasers. These lasers can typically emit light at several discrete wavelengths over the spectrum and are very versatile for use in a large number of applications. Other types of laser systems such as an optical parametric oscillator system are also suitable with the present invention.

In all of the autofocusing techniques described above, the sample plane may be located at either the outside surface of the sample or at a plane on the inside of the sample. In one technique suitable for the present invention, the sample surface is used as a reference and the light beam directed at the sample is offset by a certain amount in order to scan (or focus) on a plane inside of the sample. This technique is particularly suited for focusing on the inside of a cell.

According to another aspect of the invention, a method is provided for automatically focusing an image of an object plane in a microscope. Generally, methods consistent with the principles of the invention include: generating an autofocusing light beam; directing the autofocusing light beam against the object plane to be examined; and reflecting the autofocusing light beam off the object plane. The reflected autofocusing light beam is then directed to a detection system, where at least one light detector or sensor of the detection system senses the reflected autofocusing light beam. Thereafter, the amount of displacement of the image plane of the reflected autofocusing light beam from a desired reference plane is determined based on the sensed autofocusing light beam. With this information, the object plane can be focused on to create a properly focused image.

In methods consistent with the principles of the invention, the step of sensing may include transmitting the reflected autofocusing light beam at least partially through an aperture of an iris and measuring the light intensity of the reflected autofocusing light beam that is transmitted through the aperture with the light detector or sensor of the detection system. Alternatively, in methods consistent with the principles of the invention, the step of determining may include comparing the light intensities of the reflected autofocusing light beam detected by a plurality of the light detectors or sensors.

Figure 9:
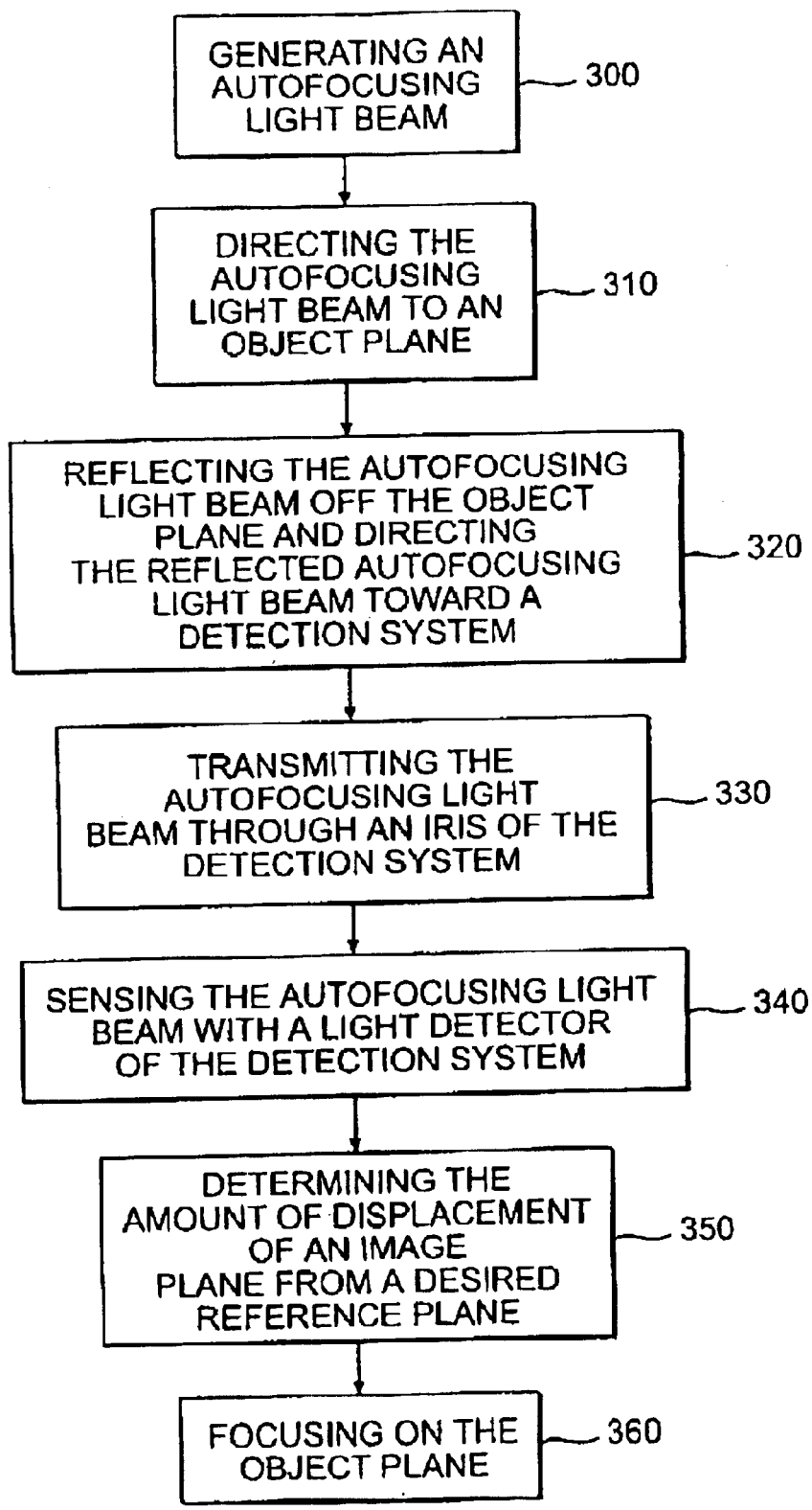
FIG. 9 is an exemplary flowchart of a method of automatically focusing an image of an object plane that can be utilized in the microscopes of FIGS. 3–4.

By way of a non-limiting example, FIG. 9 illustrates a method consistent with the aspects of the invention for automatically focusing an image of an object plane in a microscope. The embodiment of FIG. 9 may be implemented with the autofocusing systems and features discussed in connection with FIGS. 3–4. As illustrated in FIG. 9, an autofocusing light beam is generated in step 300. For example, the autofocusing light beam 40 may be generated by an autofocusing light beam source 39, as shown in FIGS. 3–4. Next, in step 310, the autofocusing light beam is directed to an object plane, such as object plane 16 in FIGS. 3–4. Thereafter, in step 320, the autofocusing light beam 40 is reflected off the object plane and directed toward a deflection system such as detection system 32 in FIG. 3A. The reflected autofocusing light beam is then transmitted through an iris of the detection system, in step 330. For example, in FIG. 3A, the autofocusing light beam 40 is transmitted through iris 60.

As further shown in FIG. 9, after transmitting the autofocusing light beam through the iris of the detection system, the autofocusing light beam is sensed with a light detector or sensor of the detection system, in step 340. To implement this step, a light detector can be selected such as any of the variety of types shown in FIGS. 3–4. In addition, to implement step 330 an iris may be provided such as that shown in FIGS. 3–4. For example, in the embodiment of FIG. 3A, the light detector 62 is positioned adjacent the aperture of the iris 60 and the iris is approximately positioned at the focal distance from the detection system lens 46. Alternatively, as shown in FIG. 4A, the iris 80 can be positioned such that it is displaced from the focal distance from the detection system lens 46, and a light detector 84 is positioned adjacent the aperture of the iris.

After sensing the light intensity of the reflected autofocusing light beam, the amount of displacement of an image plane from a desired reference plane is determined, as represented in step 350 of FIG. 9. Once again, the features and techniques described above in relation to FIGS. 3–4 may be utilized to determine the amount of displacement of the image plane based on the sensed, light intensity of the autofocusing light beam. In step 360, with the determined displacement of the image plane, the object plane is then focused on in order to create a properly focused image. For this purpose, the feedback controller 70 and focus adjusting device 72 of FIGS. 3–4 may be used to adjust the distance between the objective lens and the sample or object plane.

Figure 10:
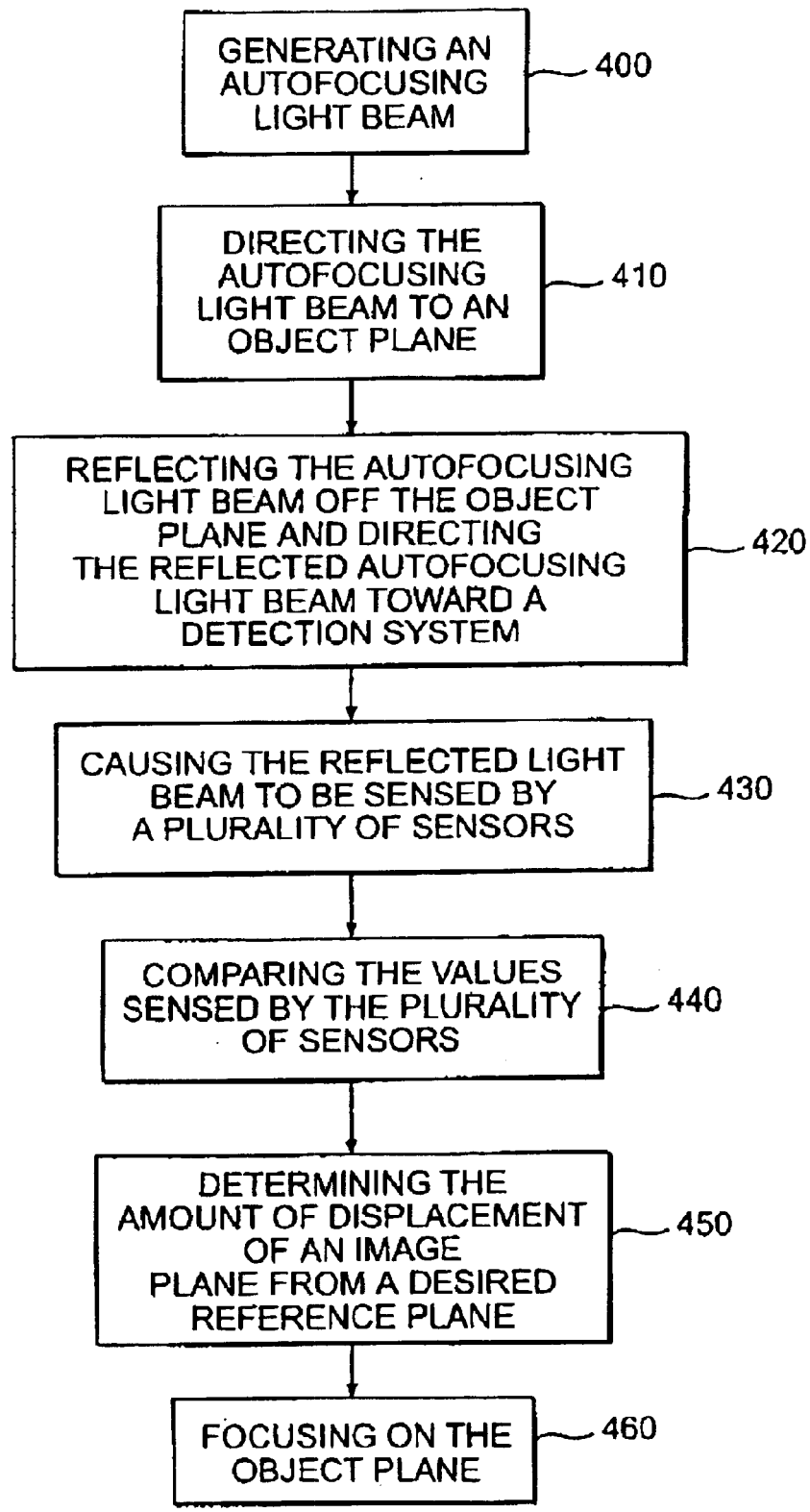
FIG. 10 is an exemplary flowchart of a method of automatically focusing an image of an object plane that can be utilized in the microscopes of FIGS. 5–8.

FIG. 10 illustrates another method for automatically focusing an image of an object plane in a microscope. The method of FIG. 10 can be implemented with the autofocusing systems and features discussed above in relation to FIGS. 5–8. In the method illustrated in FIG. 10, an autofocusing light beam is generated in step 400. For example, the autofocusing light beam 40 is generated by an autofocusing light beam source 39, as shown in FIGS. 5–8. In step 410, the autofocusing light beam is then directed to an object plane, such as object plane 16. Thereafter, in step 420, the autofocusing light beam 40 is reflected off the object plane and directed toward a deflection system. As shown at step 430 in FIG. 10, the reflected autofocusing light beam is then caused to be sensed by a plurality of light detectors or sensors. To implement steps 420 and 430, an arrangement of sensors can be provided as shown in any of the embodiments of FIGS. 5–8. For example, in FIGS. 5–7, the reflected autofocusing light beam can be divided into two separate light beams 118 and 120 by a prism 100, with the light beams being detected by pairs of light diodes 104 and 106. Alternatively, as shown in FIGS. 8A–8C, the autofocusing light beam can be transmitted through a cylindrical lens 140 and sensed by a quad photo diode 144.

As further shown in FIG. 10, after sensing the reflected autofocusing light beam with the sensors, the light intensity values sensed the plurality of sensors are compared at step 440. For example, in FIGS. 5–7, the values of light intensity sensed by each of the four diodes 108, 110, 112, and 114 is compared. Alternatively, as shown in FIGS. 8A–8C, the values of the light intensity sensed by each of the four diode segments 146, 148, 150, and 152 is compared. After the light intensity values are compared, the amount of displacement of an image plane from a desired reference plane is determined at step 450. To implement this step, the features and techniques described above in relation to FIGS. 5–8 may be utilized to determine the amount of displacement of the image plane based on the compared values of the sensors. In step 460, with the determined displacement of the image plane, the object plane is then focused on in order to create a properly focused image. For this purpose, the feedback controller 70 and focus adjusting device 72 of FIGS. 5–8 may be used to adjust the distance between the objective lens and the object plane.

The method according the present invention is apparent from the apparatus described above. Other variations may also be made to the method of the present invention.

This autofocus method relates in particular to autofocus methods and apparatus suitable for detecting, characterizing and quantifying particulate matter suspended in a fluid. More specifically, the invention provides an autofocus system for detecting particulates, particularly cells, suspended in a fluid, especially a biological fluid. More in particular, the invention provides an autofocus platform for imaging an affinity-binding based assay.

Modern drug discovery is limited by the throughput of the assays that are used to screen compounds that could possess desired effects. In particular, screening of the maximum number of different compounds necessitates reducing the time and labor requirements associated with each screen. In many cases, reaction volumes are very small to account for the small amounts of the test compounds that are available. Microscope screening of such small sample volumes compound results in errors associated with a out of focus images. As these images in general are the sole measured results further investigation such are computer calculations are performed thereon.

In high throughput screening tests the speed to obtain and maintain autofocus is an important factor. In many embodiments, the samples will be contained in standard multi-well microtiter plates, each plate having an array of wells, such as those having 96, 384, 1536, or higher numbers of wells. Standard 96 well microtiter plates which are 86 mm by 129 mm, with 6 mm diameter wells on a 9 mm pitch, are used for compatibility with current automated loading and robotic handling systems. Other known microplates are typically 20 mm by 30 mm, with cell locations that are of about 100 to 200 microns in dimension and having a pitch of about 500 microns. Both terms 'well' and 'microwell' usually refer to a specific location in an array of any construction to which cells adhere and within which the cells are imaged.

Software procedures can be provided at the user's option to in order to obtain moves in a Z-axis through a number of different positions, acquires an image at each position, and finds the maximum of a calculated focus that estimates the contrast of each image.

The present invention is also directed toward an improved microscope comprising an autofocusing apparatus for viewing a sample plane. The autofocusing apparatus as explained in combination with FIGS. 1–10 can be included within or outside the microscope housing. According to the present invention, the microscope includes a plurality of lenses positioned along a main optical axis, a probe arm supporting the plurality of lenses, a support on which a sample plane to be examined is placed, and an optical output device for creating an image of the sample plane on an image plane. In the embodiment shown, the main optical axis is unfolded and substantially extends along a single plane. As embodied herein and shown in FIGS. 11–12, the microscope 200 includes a probe arm 213. A series of lenses and other optical devices are positioned along the main optical axis 202. In the example shown in FIG. 11, the series of lenses includes an emission filter 204, tubus lens 206, illumination entrance 208, relay lens 210, and corpus lens 212. Any variety of optical devices may be positioned along the main optical axis in the probe arm 213.

Figure 11:
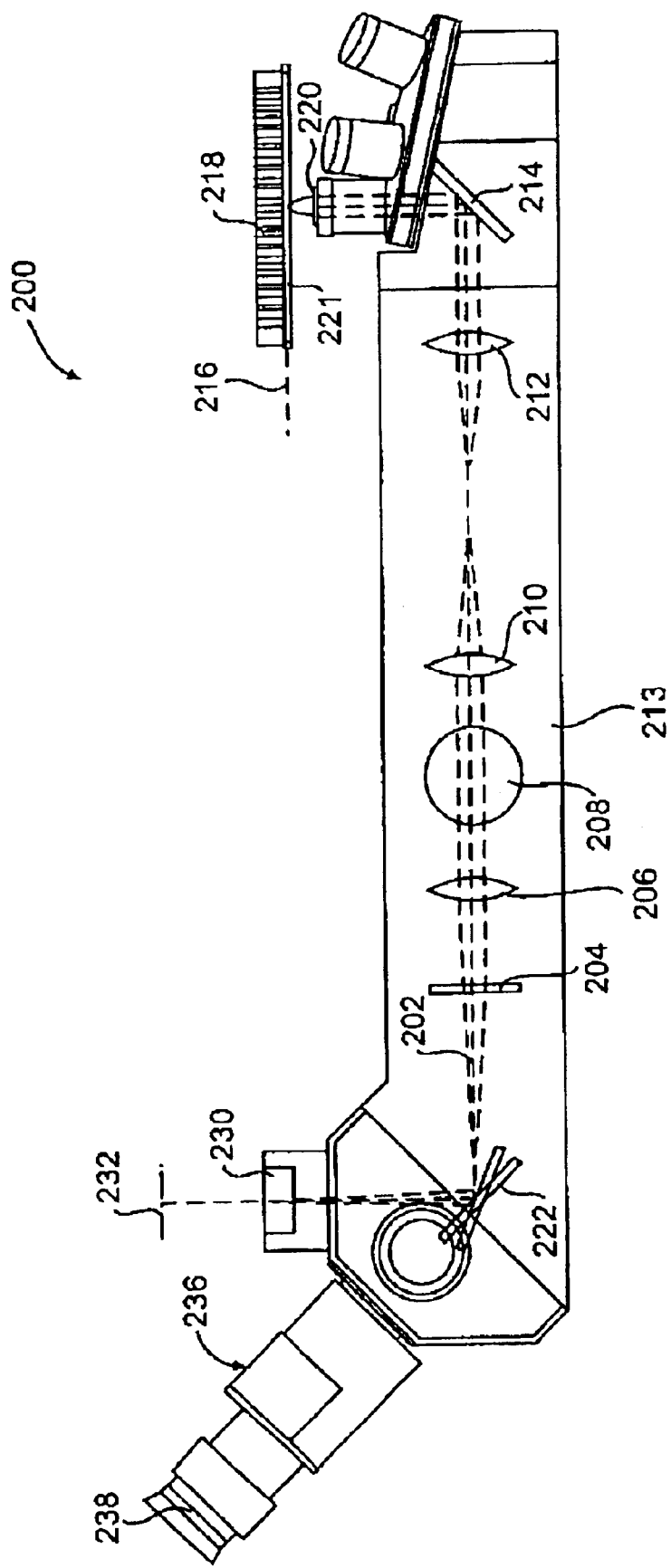
FIG. 11 is a side view of a microscope according to another embodiment of the present invention.
Figure 12:
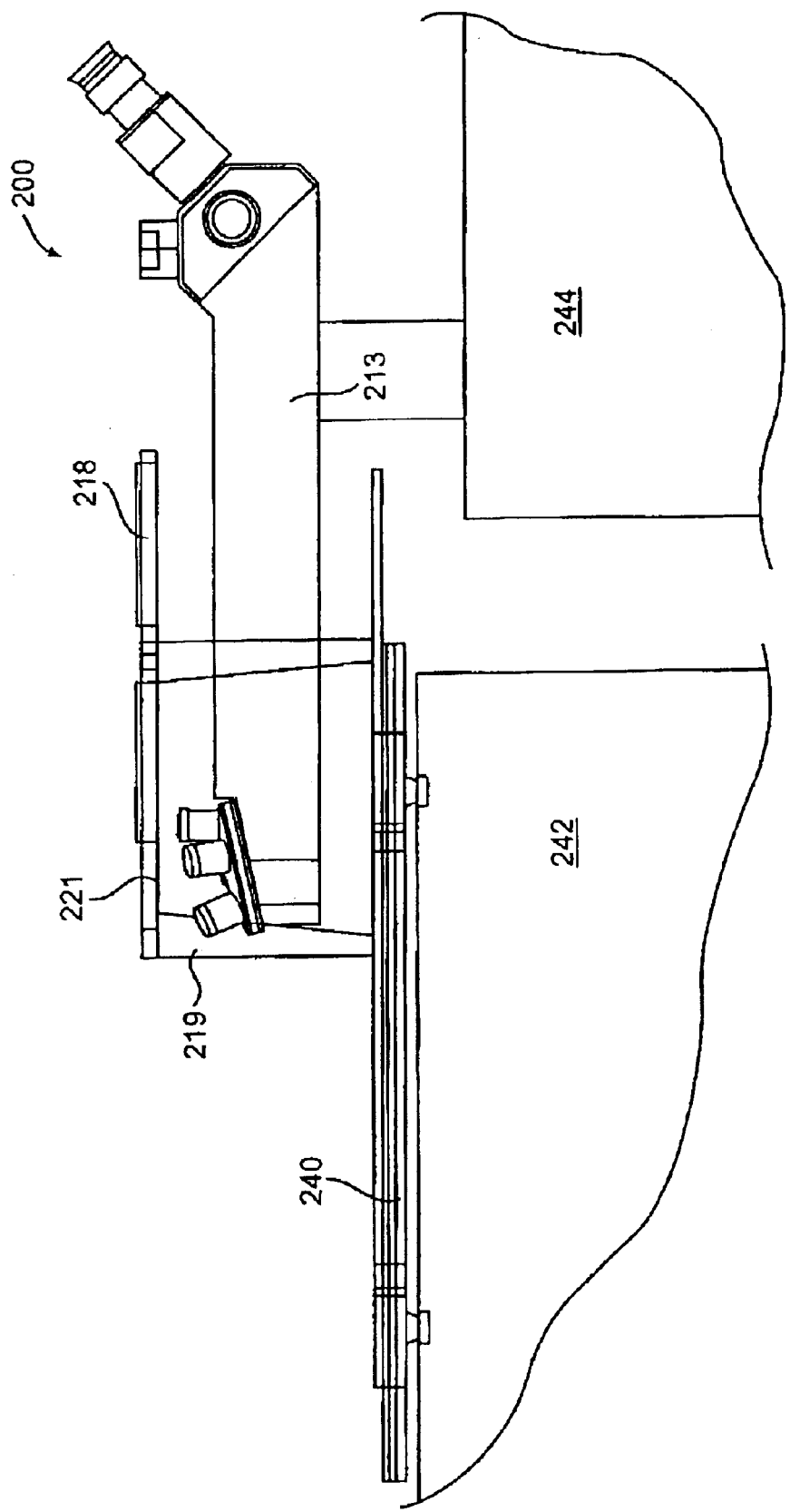
FIG. 12 is a side view of the microscope of FIG. 11 positioned on a separate table from a scanning stage.

In the example shown in FIG. 11, a plain reflecting mirror 214 is positioned toward the end of the probe arm closest to the object to be scanned. The surface of the mirror 214 is angled relative to the main optical axis 202 so that the light beams along the main optical axis 202 may be reflected toward an objective lens 220 and onto the object plane 216. In the example shown in FIG. 11, the mirror 214 is angled at, for example, 45 degrees so that the light from the object plane will be reflected back to the mirror and along the main optical axis 202 to form an image. The sample or object to be examined may be placed directly on a scanning surface 221 corresponding to the object plane 216. The object surface may correspond to the surface of the actual object or a plane within the object. As these objects or samples can have a considerable depth, the speed of autofocus can further be increased by a volume image. Such a volume image can be obtained by observing an image object at each image plane of a plurality of image planes where each image plane is vertically displaced with respect to each other image plane. Alternately, the object surface may correspond to the scanning surface 221 on which the sample is placed. The samples (or objects) may be placed in sample holding devices such as one or more microtiter plates 218 shown in FIGS. 11 and 12. The microtiter plates 218 and the samples are supported by a support 219, as shown in FIG. 12. The support 219 is mounted and rigidly secured to a scanning stage 240 that is attached to a first table 242. The support 219 maintains the samples so that they are physically isolated from the microscope, for reasons which will be discussed below. The scanning surface 221 may comprise a table movable in a X, X-Y or X-Y-Z motion.

The microscope of the embodiment shown in FIG. 11 further includes a second plain reflecting mirror 222 at the leftmost portion of the main optical axis 202 of the probe arm 213. The light reflected off the second plain reflecting mirror 222 is directed toward a first video output 230 and first video focal plane 232. The microscope also includes a second video output 234 and an eyepiece assembly 236 with an image plane 238. As is known in the art, the image plane may be either a position where a viewer's eye is placed, or a place where a camera or image detecting device is positioned.

The microscope is preferably configured so that the probe arm 213 has an elongated shape as shown in FIGS. 11–12. This is accomplished by designing the probe arm so that the main optical axis 202 is unfolded. The elongated shape and unfolded main axis particularly desirable in order to minimize the transmittal of vibrations from vibration generating structures adjacent the probe arm for reasons which will be discussed below. The second embodiment of the present invention is also suited for microscope devices that scan the image of the object. During scanning, scanning motors typically generate undesirable vibrations. If the scanning stage with the scanning motors is placed on or against the probe arm of the microscope, vibrations from the motors are typically transmitted to the microscope, resulting in images of low quality.

The elongated design of the microscope permits the mounting of the microscope on a separate table from the table on which a scanning stage is mounted. For example, as shown in FIG. 12, the scanning stage 240 for a microscope may be placed on the first table 242, and the microscope 200 may be placed on a separate table 244. The first table 242 may be a heavy or sturdy table structure, and the scanning stage 240 may be rigidly attached or fixed to the surface of the first table. As further shown e in FIG. 12, the microtiter plates 218 may be supported via the support structure 219 on the scanning stage 240, so that the plates are physically isolated from the probe arm 213 of the microscope. In this manner, vibrations from the scanning stage 240 are not imparted onto the microscope 200. Therefore, because there are a lack of vibrations on the microscope, it will be easier to obtain a focused image of the sample by either manual or automatic processes.

In the example shown in FIGS. 11–12, the main optical axis 202 of the microscope is configured to be parallel with the object plane 216. This configuration, together with the elongated probe arm, allows the viewer to be positioned at a substantial distance from the samples that are being observed. This can be particularly desirable if dealing with samples that involve toxic chemicals, or if the samples must be placed in an isolated room or chamber that is removed from the area in which the viewer is located. Moreover, the optics can be changed without having to enter the isolated room or chamber. As a result, the improved microscope of the present invention permits microscopy for a wider range of sample types.

The elongated probe arm and microscope of FIGS. 11–12 also has other benefits. For example, the longer probe arm allows for scanning larger objects with the microscope. The longer probe arm also allows several objects to be scanned at once, without unloading and reloading the scanning stage. Moreover, the longer probe arm allows the optics to be more accessible. Because of the design, it is also easier to incorporated additional optics into the probe arm of the instrument. The longer probe arm also allows for additional accessories to be included, such as the autofocus system of the first embodiment of the invention.

It will be apparent to those skilled in the art that various modifications and variations can be made in the disclosed embodiments relating to an apparatus for automatically focusing an optical instrument onto an object plane, a method of automatically focusing an optical instrument onto an object plane, and a microscope for focusing on an object plane, use of the apparatus of the present invention, and in construction of this apparatus, without departing from the scope or spirit of the invention. The features and aspects of the disclosed embodiments may be combined, modified or substituted to provide additional advantages and features.

For example, while features of the invention are disclosed with reference to autofocusing and illumination light beams that are different wavelengths to permit simultaneous operation, it is of course possible to select light beams that are of the same or similar wavelength. In such a case, the features of the invention may be implemented in an asynchronous mode, in which the autofocusing light beam is generated and applied at a different time from that of the illumination light beam. It is also possible to implement the light beams and features of the invention in an asynchronous mode regardless of the wavelengths of the light beams (i.e., irrespective of the whether the autofocusing light beam and the illumination light beam have the same or different wavelengths).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A microscope suitable for high-throughput screening for viewing an object plane, comprising:

a plurality of lenses positioned along a main optical axis of the microscope;

a probe arm supporting the plurality of lenses, said probe arm extending generally along the main optical axis;

a support on which an object with an object plane to be examined is placed, the object plane substantially extending alone a focus plane that is observed through the microscope;

an optical output device for creating an image of the object plane on an image plane, and an autofocusing apparatus for automatically focusing an image of the object plane, wherein the main optical axis is unfolded and substantially extends alone a single plane, wherein the object to be examined is positioned on a support connected to the separate support structure of the scanning stage and said probe arm positioned between the object to be examined and the scanning stage.

* * * * *

UNITED STATES PATENT AND TRADEMARK OFFICE
CERTIFICATE OF CORRECTION

PATENT NO. : 7,016,110 B2
APPLICATION NO. : 10/220872
DATED : March 21, 2006
INVENTOR(S) : Leblans et al.

It is certified that error appears in the above-identified patent and that said Letters Patent is hereby corrected as shown below:

Title Page,
Item (75), Inventor:
Second inventor missing, insert -- Philip Arthur Van Doninck, Waterloo (BE) --.
Item (12) should read: Leblans, et al.

Title Page,
Item (62), Related U.S. Application Data:
Insert -- Claims benefit of 09/521,618, filed on March 8, 2000. --.

Column 1,
Line 14, delete "1." before "Field of the Invention".
Line 20, delete "2." before "Description of the Related Art".

Column 2,
Line 3, delete "In" and insert -- in --.
Column 5,
Line 54, delete "focussing" and insert -- focusing --.

Column 6,
Line 1, delete "a" and insert -- an --.
Line 19, delete "an" and insert -- a --.

Column 14,
Line 3, delete "an" and insert -- a --.

Column 18,
Line 42, delete "help" and insert -- helps --.

Column 20,
Line 63, after "according" insert -- to --.

Column 21,
Line 17, delete "are" and insert -- as --.

Column 22,
Line 57, after "shown" delete "e".

Column 23,
Lines 18-19, delete "incorporated" and insert -- incorporate --.

UNITED STATES PATENT AND TRADEMARK OFFICE
CERTIFICATE OF CORRECTION

PATENT NO. : 7,016,110 B2
APPLICATION NO. : 10/220872
DATED : March 21, 2006
INVENTOR(S) : Leblans et al.

It is certified that error appears in the above-identified patent and that said Letters Patent is hereby corrected as shown below:

Column 24,
Line 25, delete "alone" and insert -- along --.

Signed and Sealed this

Fourteenth Day of November, 2006

JON W. DUDAS
*Director of the United States Patent and Trademark Office*